United States Patent
Morimoto et al.

[11] Patent Number: 6,081,494
[45] Date of Patent: Jun. 27, 2000

[54] DISC RECORDING AND REPRODUCING APPARATUS HAVING A DRIVE MECHANISM FOR LOADING AND EJECTING A DISC CARTRIDGE

[75] Inventors: Takao Morimoto; Shigeki Asai; Takayuki Niioka; Tatsunori Fujiwara, all of Tokyo, Japan

[73] Assignee: Mitsubishi Denki Kabushiki Kaisha, Tokyo, Japan

[21] Appl. No.: 08/676,487

[22] Filed: Jul. 8, 1996

[30] Foreign Application Priority Data

Jan. 31, 1996 [JP] Japan ................... 8-015274

[51] Int. Cl.⁷ .................... G11B 17/04; G11B 33/02
[52] U.S. Cl. .................... 369/77.2; 369/75.2
[58] Field of Search ................... 369/77.1, 77.2, 369/75.1, 75.2, 191, 192, 178; 360/98.06, 99.02, 99.06, 98.08, 97.01

[56] References Cited

U.S. PATENT DOCUMENTS

| | | | |
|---|---|---|---|
| 4,722,011 | 1/1988 | Klos-hein | 360/93 |
| 4,734,800 | 3/1988 | Suzuki | 360/85 |
| 4,772,965 | 9/1988 | Kato et al. | 360/71 |
| 4,878,139 | 10/1989 | Hasegawa et al. | 360/99.02 |
| 5,123,004 | 6/1992 | Arai | 369/75.2 |
| 5,144,612 | 9/1992 | Isobe et al. | 369/77.1 |
| 5,481,423 | 1/1996 | Aoki | 360/99.06 |
| 5,537,377 | 7/1996 | Takai et al. | 369/77.2 |
| 5,559,649 | 9/1996 | Ito et al. | 360/99.06 |
| 5,574,705 | 11/1996 | Suzuki | 369/75.2 |
| 5,682,371 | 10/1997 | Park | 369/77.1 |

FOREIGN PATENT DOCUMENTS

| | | |
|---|---|---|
| 0539199A2 | 4/1993 | European Pat. Off. . |
| 0644539 | 9/1994 | European Pat. Off. . |
| 0644539A2 | 3/1995 | European Pat. Off. . |
| 0684603 | 11/1995 | European Pat. Off. . |
| 0684603A2 | 11/1995 | European Pat. Off. . |
| 4422997A1 | 1/1995 | Germany . |
| 3-268265 | 11/1991 | Japan . |
| 5174478 | 7/1993 | Japan . |

OTHER PUBLICATIONS

English language abstract of JP–A 5–174478.

*Primary Examiner*—Stuart S. Levy
*Assistant Examiner*—Kenneth Fields

[57] ABSTRACT

A disc device having a floating base supported by a chassis through a plurality of elastic members, a holder which is supported on the floating base so as to be able to move vertically with respect to the floating base, and into which a disc cartridge is inserted, a slider, slidably disposed so as to move in directions of inserting and discharging a disc cartridge into and out of the disc device, for holding and carrying a disc cartridge inserted thereinto, and a driving arm, one end part of which is rotatably supported on an axis, and another end part of which can be engaged with the slider for inserting and discharging the disc cartridge. Furthermore, the device having a pair of slide plates slidably fixed on the chassis, for securing the floating base to the chassis and for releasing the floating base from the chassis, a pair of links for sliding the pair of slide plates, and a rotary member for rotating the driving arm so as to drive the slider and for driving the pair of links.

17 Claims, 40 Drawing Sheets

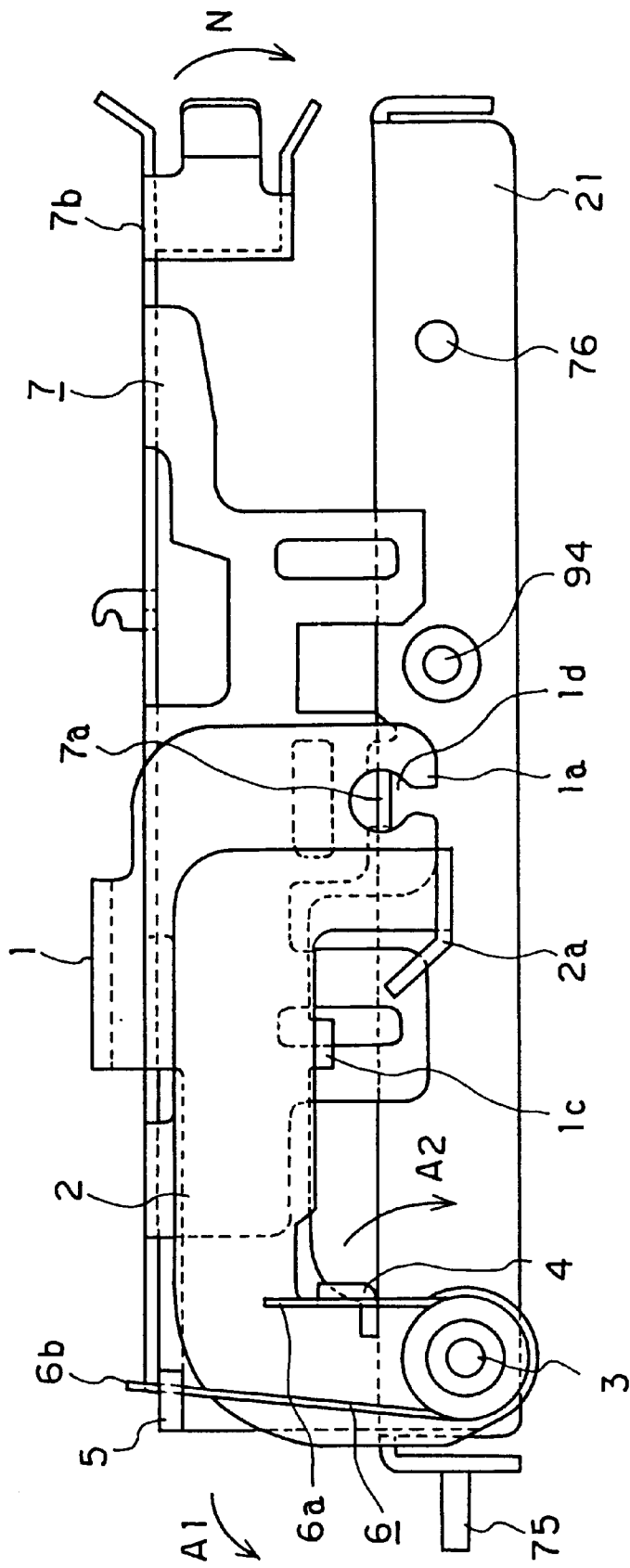

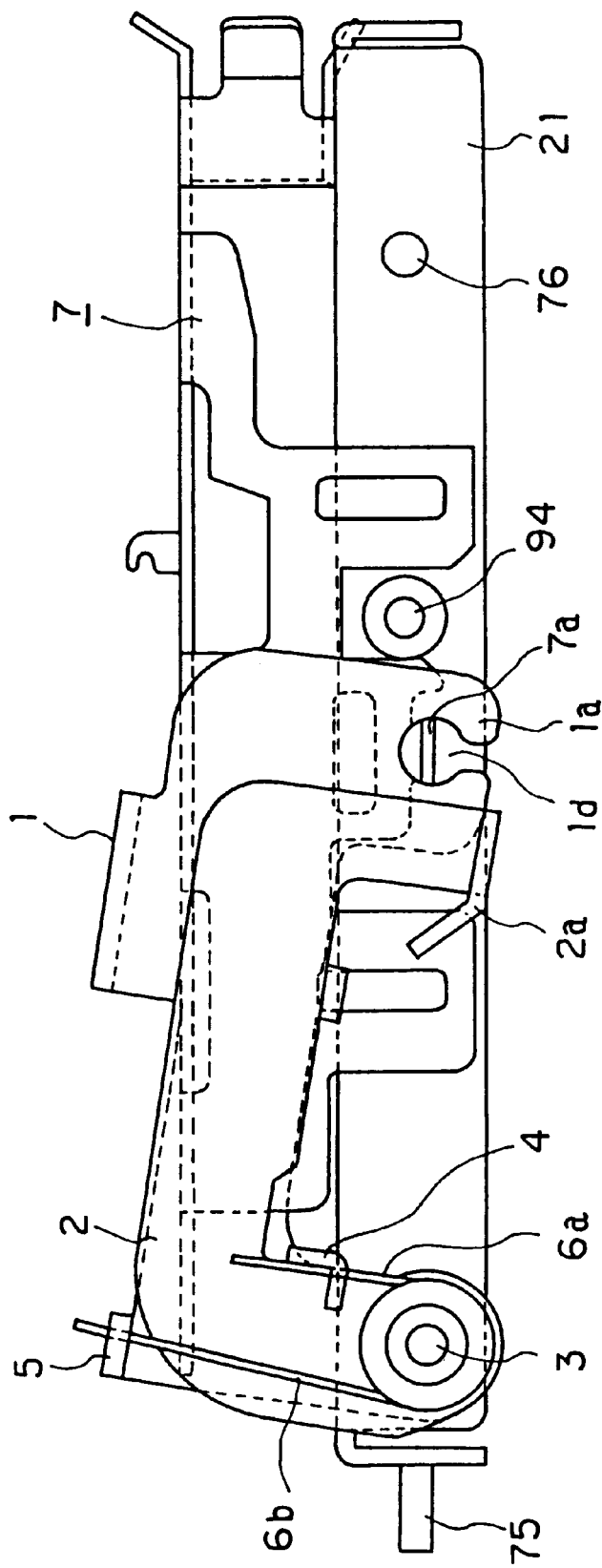

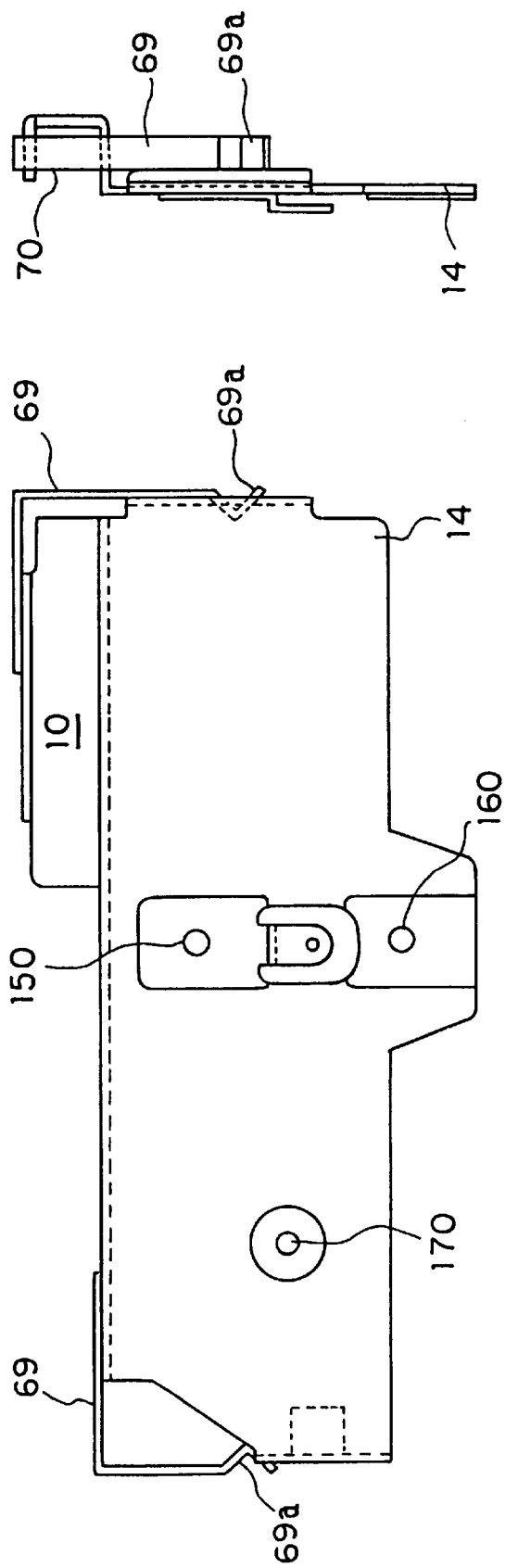

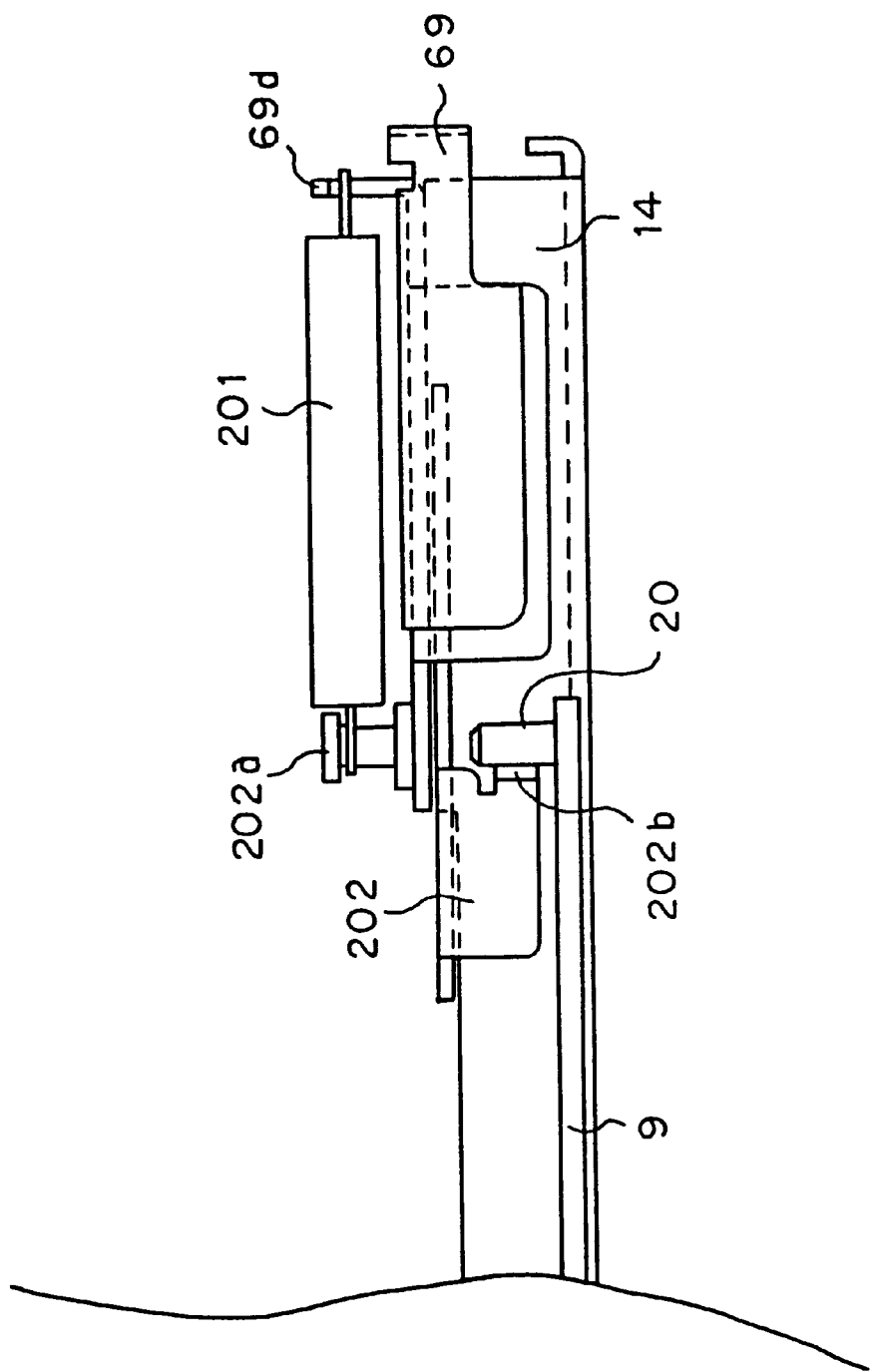

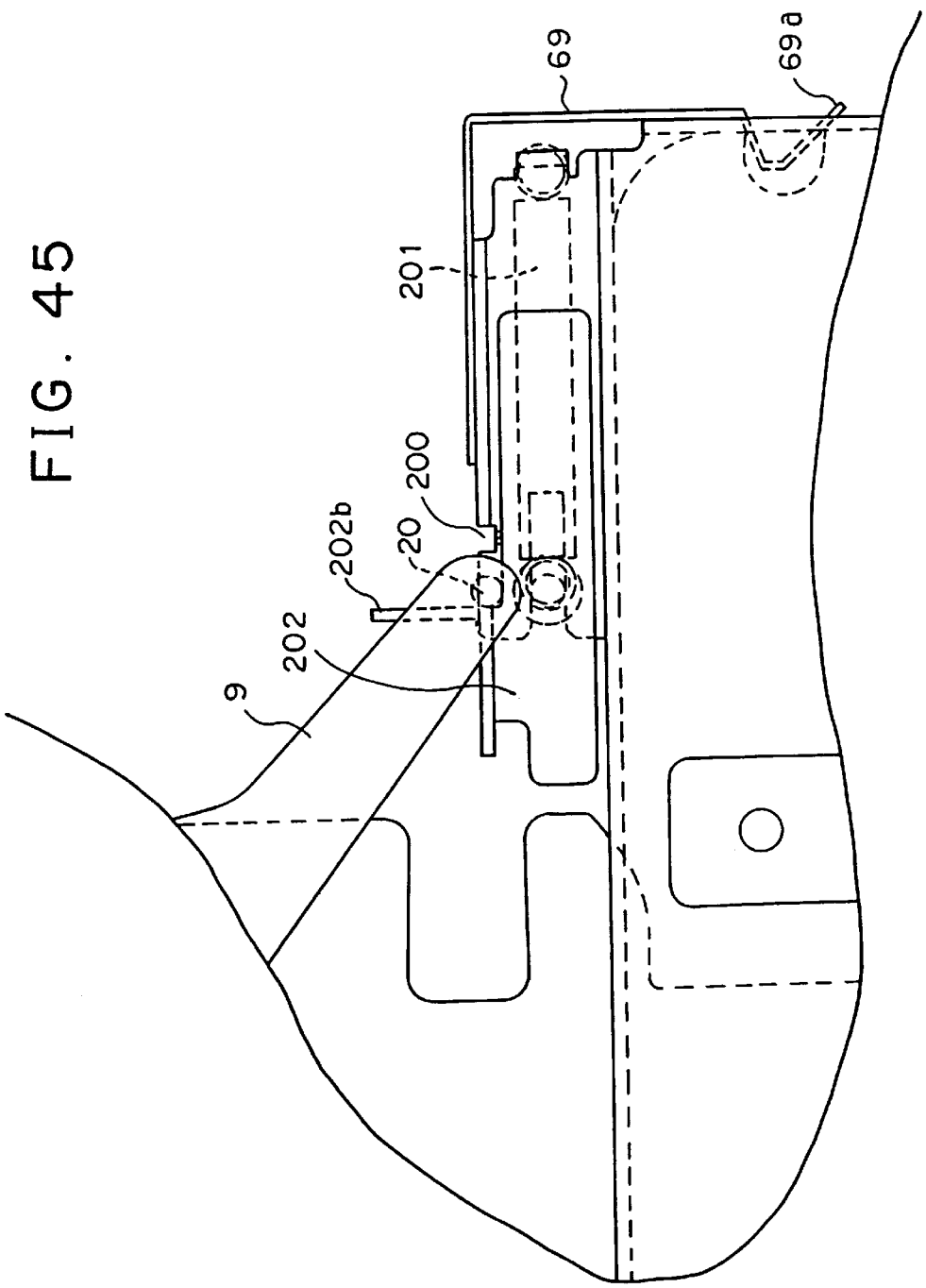

DISC RECORDING AND REPRODUCING APPARATUS HAVING A DRIVE MECHANISM FOR LOADING AND EJECTING A DISC CARTRIDGE

BACKGROUND OF THE INVENTION

1. Field of the Invention

The present invention relates to a disc device such as a motor-vehicle-mounted disc device for playing back a mini disc.

2. Description of the Prior Art

Recent years have seen advances in the area of reducing the physical size of such a disc device since mini-disc players were brought out. However, further downsizing of a motor-vehicle-mounted disc device has been required.

Conventionally, as disclosed in Japanese Patent Application Laid Open (KOKAI) No.5-174478, for example, a cartridge inserting and discharging mechanism for a mini-disc player is so constructed that, when carrying a mini disc to its replay position, a cartridge holder carrier provided with a rack plate, which is driven by rotation of a power motor, carries a cartridge holder with the disc, and the engagement of a locking axis (or a locking pin) of a supporting base (or a floating base) with an axis engaging groove (or a pin engaging groove) is released. Then, the supporting base becomes a floating state, and the mini disc is played back.

Such a prior art disc device as mentioned above suffers from disadvantages that the assembly of the device is complicated and it is difficult to reduce the physical size of the device.

SUMMARY OF THE INVENTION

The purpose of the present invention is to overcome these disadvantages. More precisely, an object of the present invention is to provide a disc device which can be assembled easily and which can be downsized.

In accordance with one aspect of the present invention, there is provided a disc device comprising: a floating base supported by a chassis through a plurality of elastic members; a holder supported on the floating base so as to be able to move vertically with respect to the floating base; a slider, slidably disposed in the holder so as to move in directions of inserting and discharging a disc cartridge into and out of the holder, for holding and carrying a disc cartridge inserted thereinto; a locking mechanism which secures the floating base to the chassis when inserting a disc cartridge held in the slider into the holder and when discharging a disc cartridge out of the holder, and which releases the floating base from the chassis when writing to and replaying a disc cartridge inserted into the holder; and a driving arm mechanism, rotatably disposed in the chassis and engaged with the slider so as to carry the slider together with the disc cartridge when inserting a disc cartridge held in the slider into the holder and when discharging a disc cartridge out of the holder, the driving arm mechanism being separate from the slider when writing to and replaying a disc cartridge inserted into the holder.

Preferably, the driving arm mechanism includes an engaging portion, and the disc device further comprises a rotary member having a projection portion which can move along the engaging portion of the driving arm mechanism so as to cause the driving arm mechanism to rotate as the rotary member rotates, and a holding mechanism for securely holding the projecting portion of the rotary member which is engaged in the engaging portion of the driving arm mechanism at least while the driving arm mechanism is separate from the slider and the projecting portion is located in one end of the engaging portion.

The driving arm mechanism can include a first arm, one end part of which can be engaged with the slider for inserting and discharging the disc cartridge, and a second arm which forms a gap as the engaging portion in cooperation with the first arm.

Preferably, the holding mechanism is a spring, engaged between the first and second arms, for urging them towards each other so as to narrow the gap in which the projecting portion of the rotary member is engaged. Furthermore, the gap is formed so that the projecting portion of the rotary member is securely held in the gap by the spring at least while the first arm is separate from the slider and the projecting portion is located in one end of the engaging portion.

The driving arm mechanism comprises a pin disposed at one end part thereof and the slider comprises a groove portion within which the pin of the driving arm mechanism can slide as the driving arm mechanism rotates.

The disc device further comprises a switch mechanism for activating and deactivating the driving mechanism in accordance with whether or not the driving arm mechanism is in contact with the switch mechanism.

In accordance with another aspect of the present invention, there is provided a disc device comprising: a floating base supported by a chassis through a plurality of elastic members; a holder which is supported on the floating base so as to be able to move vertically with respect to the floating base, an into which a disc cartridge is inserted; a pair of slide plates which is slidably fixed on the chassis, for securing the floating base to the chassis and for releasing the floating base from the chassis; a pair of arms for sliding the pair of slide plates; and a rotary member for driving the pair of arms.

The disc device further comprises an urging mechanism for urging the pair of slide plates in opposite directions. Furthermore, each of the pair of slide plates is provided with two locking grooves respectively engaged with two pins attached on the floating base when the floating base is locked.

In accordance with a preferred embodiment of the present invention, one of the pair of slide plates is provided with two slide plate members which can slide in opposite directions through a link plate engaged with the slide plate members.

The holder comprises an inclined portion. Furthermore, the holder moves vertically and dissociates itself from the floating base when the inclined portion of the holder is engaged with one of the pair of slide plates. The holder moves vertically toward the floating base and a disc cartridge in the holder is loaded onto the floating base when the engagement of the inclined portion of the holder with the one slide plate is released. The disc device further comprises a switch mechanism for activating and deactivating the driving mechanism in accordance with whether or not one of the pair of slide plates is in contact with the switch mechanism.

Further objects and advantages of the present invention will be apparent from the following description of the preferred embodiments of the invention as illustrated in the accompanying drawings.

BRIEF DESCRIPTION OF THE DRAWINGS

FIG. 2b is a general side view showing the cartridge inserting and discharging mechanism shown in FIG. 2a;

FIG. 2c is a general side view showing the cartridge inserting and discharging mechanism in a state wherein a holder is moved down toward a floating base;

FIGS. 9a and 9b are a top view and a side view of the slider slidably disposed within the holder of the disc device of the first embodiment, respectively;

FIG. 44 is a rear view showing the slider of a disc device according to a second embodiment of the present invention;

FIG. 45 is a plan view partially showing the slider shown in FIG. 44;

DETAILED DESCRIPTION OF THE PREFERRED EMBODIMENTS

Next, a description will be made as to a disc device according to an embodiment of the present invention.

Roughly speaking, the disc device can be divided into four mechanisms as follows. The first mechanism is a disc cartridge inserting and discharging mechanism. The second mechanism is a floating base locking mechanism for locking and unlocking a floating base. The third mechanism is a pickup moving mechanism. The fourth mechanism is a power motor peripheral mechanism.

Next, the description will be directed to the basic operation of the disc device. First, the disc cartridge inserting and discharging mechanism carries a disc cartridge into its playback position where the cartridge can be loaded onto the floating base. Then, the floating base locking mechanism unlocks the floating base, so that a chassis holds the floating base by means of a vibration-absorbing mechanism. As a result, it is difficult for vibrations from outside to reach the floating base. Next, the disc device starts to play back the disc loaded on the floating base. During the playback of the disc, the pickup moving mechanism moves the pickup in the radial direction of the disc. When the playback of the disc is completed, the floating base locking mechanism locks the floating base, and then the disc cartridge inserting and discharging mechanism discharges the disc cartridge out of the disc device. Finally, the operation is finished. The power motor is a drive source which serves to drive the disc cartridge inserting and discharging mechanism and floating base locking mechanism.

The basic operation of the disc device is as described above. Next, a detailed description will be made of the structure and operation of each of the four mechanisms.

Figure 1:
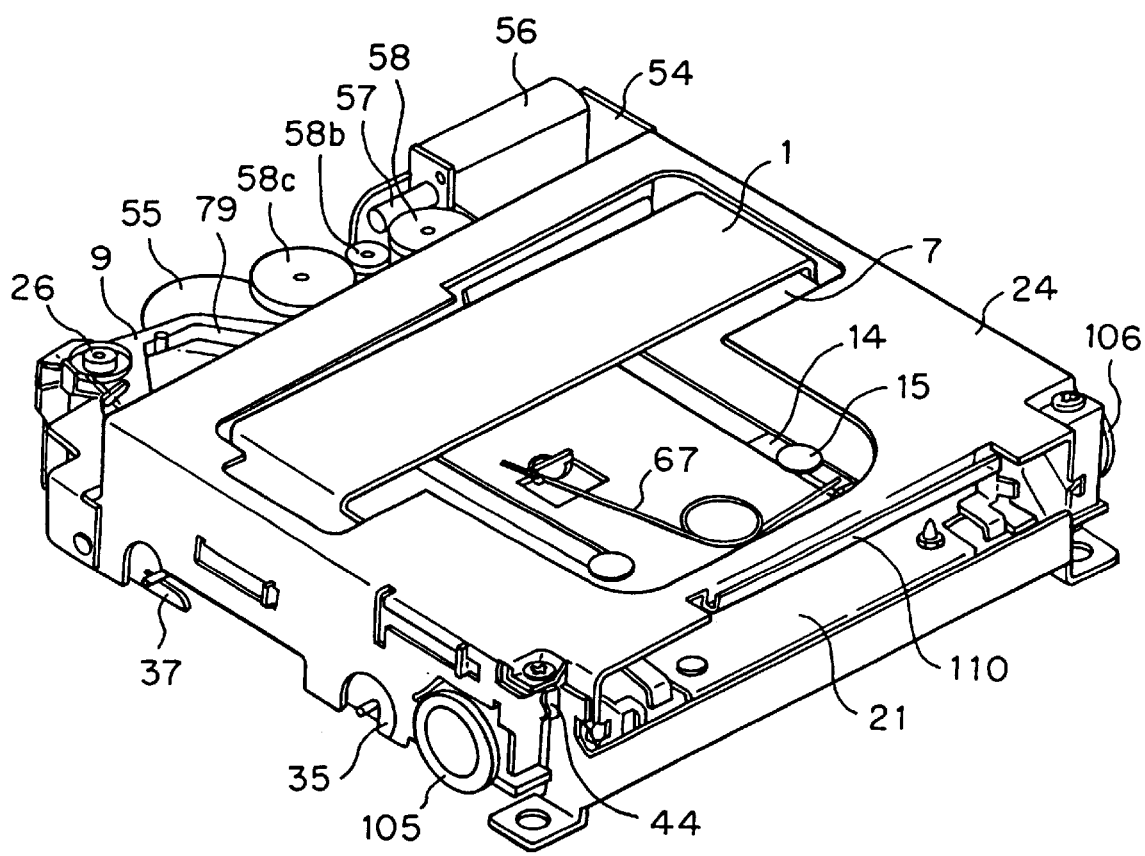
FIG. 1 is a perspective view of a disc device according to the present invention.

Referring now to FIG. 1, it illustrates a perspective view showing an outward appearance of a disc device according to the present invention. When a disc cartridge is inserted into the disc device through an insertion opening 110, if the user pushes a play start button or pushes the disc cartridge into a predetermined position, the disc cartridge inserting and discharging mechanism causes the power motor 56 to drive an ejector arm 9 so as to carry the disc cartridge to the playback position. Furthermore, when the user pushes an discharge button (or eject button), the disc cartridge inserting and discharging mechanism carries the disc cartridge from the playback position to a position where the user can take out the disc cartridge easily.

Figure 2A:
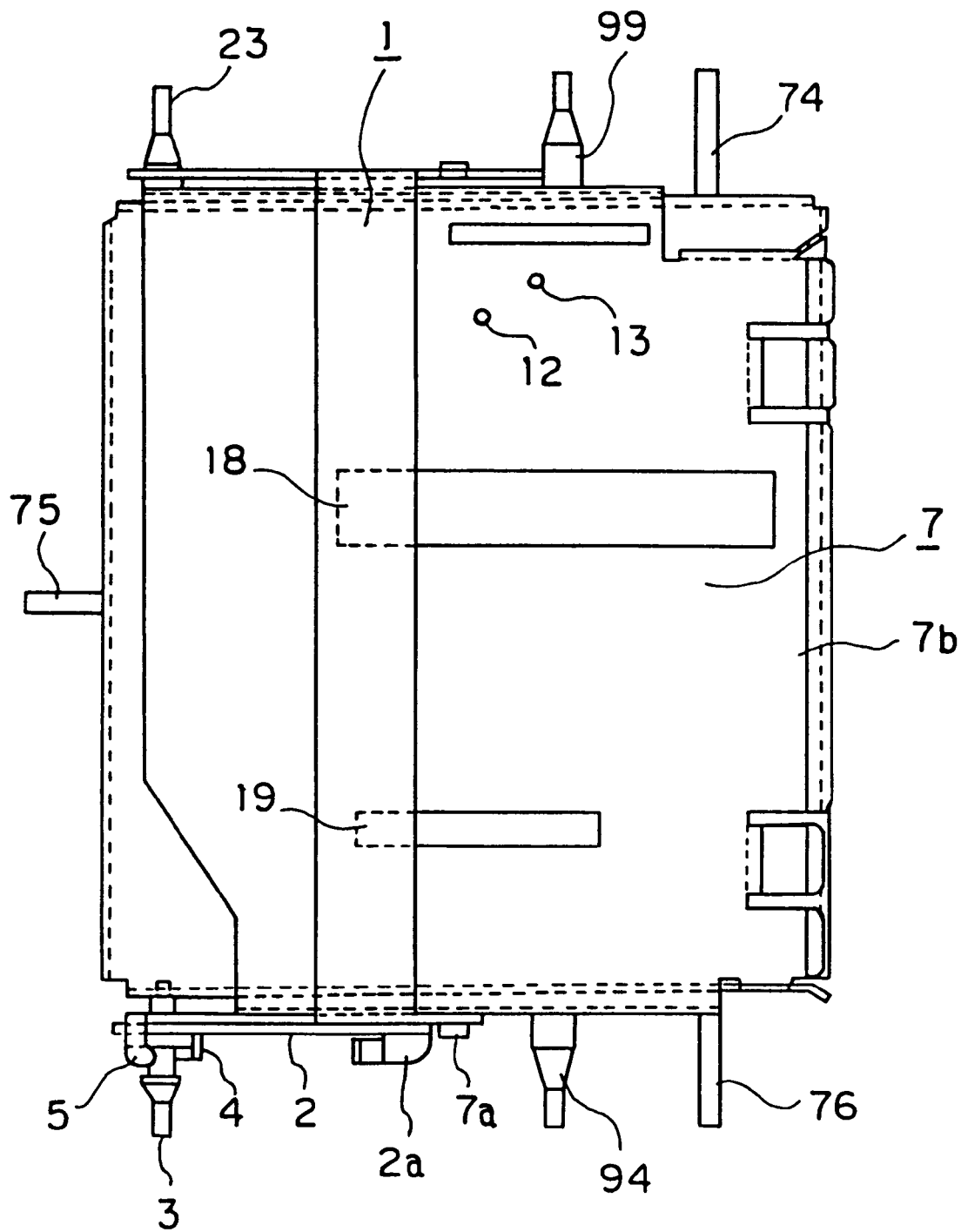
FIG. 2a is a general top plan view showing a cartridge inserting and discharging mechanism of a disc device according to a first embodiment of the present invention.
Figure 3A:
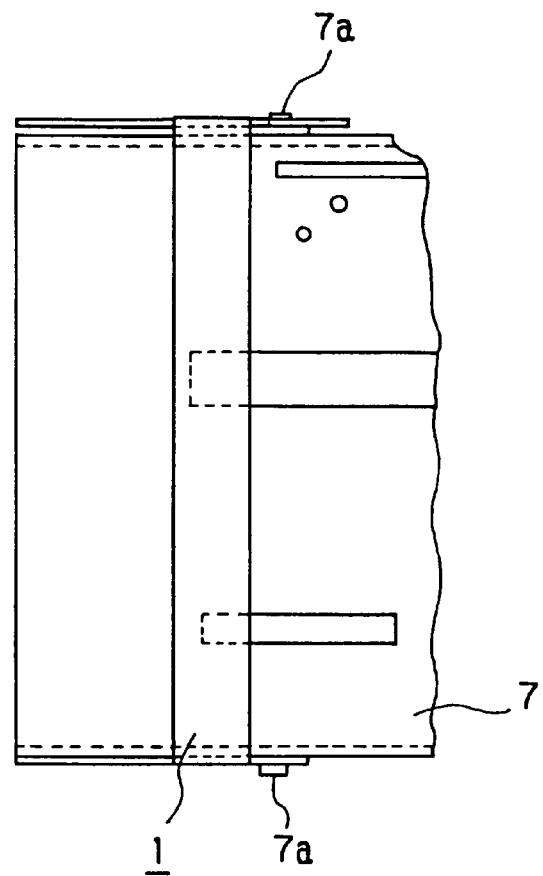
FIG. 3a is a top view showing the assembly of a holder arm and the holder of the disc device of the first embodiment.
Figure 3B:
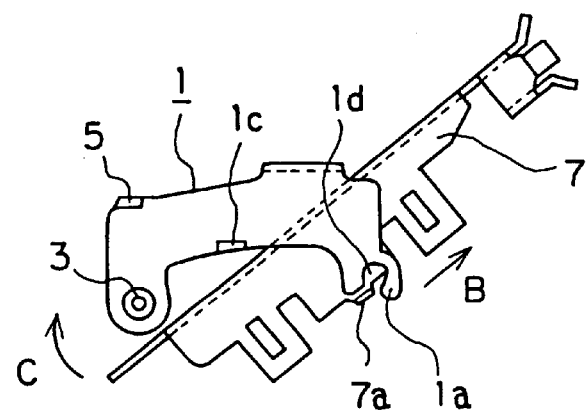
FIG. 3b is a side view showing the assembly of the holder arm and holder of the disc device of the first embodiment.

Referring now to FIGS. 2a and 2b, they respectively illustrate a top view and a side view of the disc cartridge inserting and discharging mechanism constructed from a holder arm 1, a side arm 2, a holder 7 and the floating base 21 which are accommodated within the chassis 24. Furthermore, FIG. 2c is a side view showing a state in which the disc cartridge held in the holder 7 is loaded on the floating base 21 together with the holder 7 so that the disc can be played back. FIGS. 3a and 3b show a top view and a side view showing the assembly of the holder arm 1 and holder 7, respectively.

In FIGS. 2b and 2c, reference numeral 1a denotes a notch portion disposed in a lower side part of the U-shaped holder arm 1, 1d denotes a circle-shaped notch formed in the notch portion, and 1c denotes a stopping portion projecting from a side surface of the holder arm 1. The stopping portion of the holder arm is adapted to abut on the side arm 2 so as to stop the movement of the side arm relative to the holder arm. The side arm 2 is arranged outside the holder arm 1 and in parallel with the side surface of the holder arm 1. Furthermore, 2a denotes an inclined portion projecting from a side surface of the side arm 2 and having an inclined surface which can be brought into contact with a slide plate 37 (see FIG. 11), slidably attached on the chassis 24, when the floating base 21 is locked.

In addition, reference numeral 3 denotes a pin which is fixed at the holder arm 1 and is penetrating the side arm 2. The side arm 2 is rotatably supported by the pin 3. Reference numeral 4 denotes a projecting portion projecting, which is formed by cutting and bending, from the side arm 2, and 5 denotes a projecting portion, which is formed by cutting and bending, projecting from the holder arm 1. The projecting portions 4 and 5 are engaged with the arm portions 6a and 6b of a spring 6, respectively. For example, a twisting spring is used as the spring 6. The holder arm 1 and side arm 2 can rotate about the pin 3. Therefore, the arm portion 6b of the spring 6 urges the projecting portion 5 in the direction indicated by the arrow A1 in FIG. 2b and the arm portion 6a of the spring 6 urges the projecting portion 4 in the direction indicated by the arrow A2 in FIG. 2b. Simultaneously, the stopping portion 1c of the holder arm 1 arrests the rotational movement of the side arm 2 relative to the holder arm 1.

Reference numeral 7a denotes a pair of projecting portions formed on both side surfaces of the box-shaped holder 7 as shown in FIG. 3a. The cross section of each of the pair of projecting portions 7a is shaped such that its thickness in the direction of inserting a cartridge, i.e., the horizontal thickness is larger than the vertical width. That is, the projecting portion 7a is shaped like a plate and the holder 7 is arranged such that the longitudinal side of the projecting portion is in parallel with the direction of inserting a disc cartridge into the holder, in this case, the longitudinal side of the projecting portion is running horizontally. The upper surface of the holder 7 in the vicinity of the insertion opening 110, as shown in FIG. 1, through which a disc cartridge is inserted is indicated by reference numeral 7a.

Next, a description will be made as to the assembly of the holder arm 1 and holder 7. First, the holder 7 is inserted into the holder arm 1 in the direction indicated by the arrow B so that the projecting portion 7a fits into the notch portion 1a, as shown in FIG. 3b. After the pair of projecting portions 7a are fitted into the pair of circle-shaped notches 1d of the notch portions 1a, the holder 7 is rotated in the direction indicated by the arrow C. Then, the pair of projecting portions 7a are engaged in the pair of notch portions 1a, as shown in FIG. 2b. Thus, once the assembly is completed, the holder arm 1 can rotate with respect to the holder 7 since the pair of projecting portions 7a can pivot within the pair of circle-shaped notches 1d. As will be mentioned later, since the holder 7 does not rotate with respect to the holder arm 1 until the pair of projecting portions 7a of the holder reach their inserting position where they have been inserted into the pair of notch portions 1a, the holder 7 and holder arm 1 cannot separate from each other. The width of the opening of each of the pair of circle-shaped notches 1d in the pair of notch portions 1a of the holder arm 1 is smaller than the longitudinal width of each of the pair of projecting portions 7a of the holder 7. Therefore, the pair of projecting portions 7a cannot fall off the pair of circle-shaped notches 1d. Furthermore, since the pair of projecting portions 7a are formed on both of the side surfaces of the holder 7, the provision of the pair of projecting portions 7a does not increase the vertical size of the holder 7.

As shown in FIG. 2a, a pin 23 which is engaged with the holder arm 1 is disposed at one side surface of the floating base 21 on which a cartridge inserted into the holder 7 can be loaded when replaying the disc in the cartridge. Furthermore, the floating base 21 is provided with supporting axes 74, 75 and 76 supported by elastic members 105, 106 and so on as shown in FIG. 1.

Figure 4:
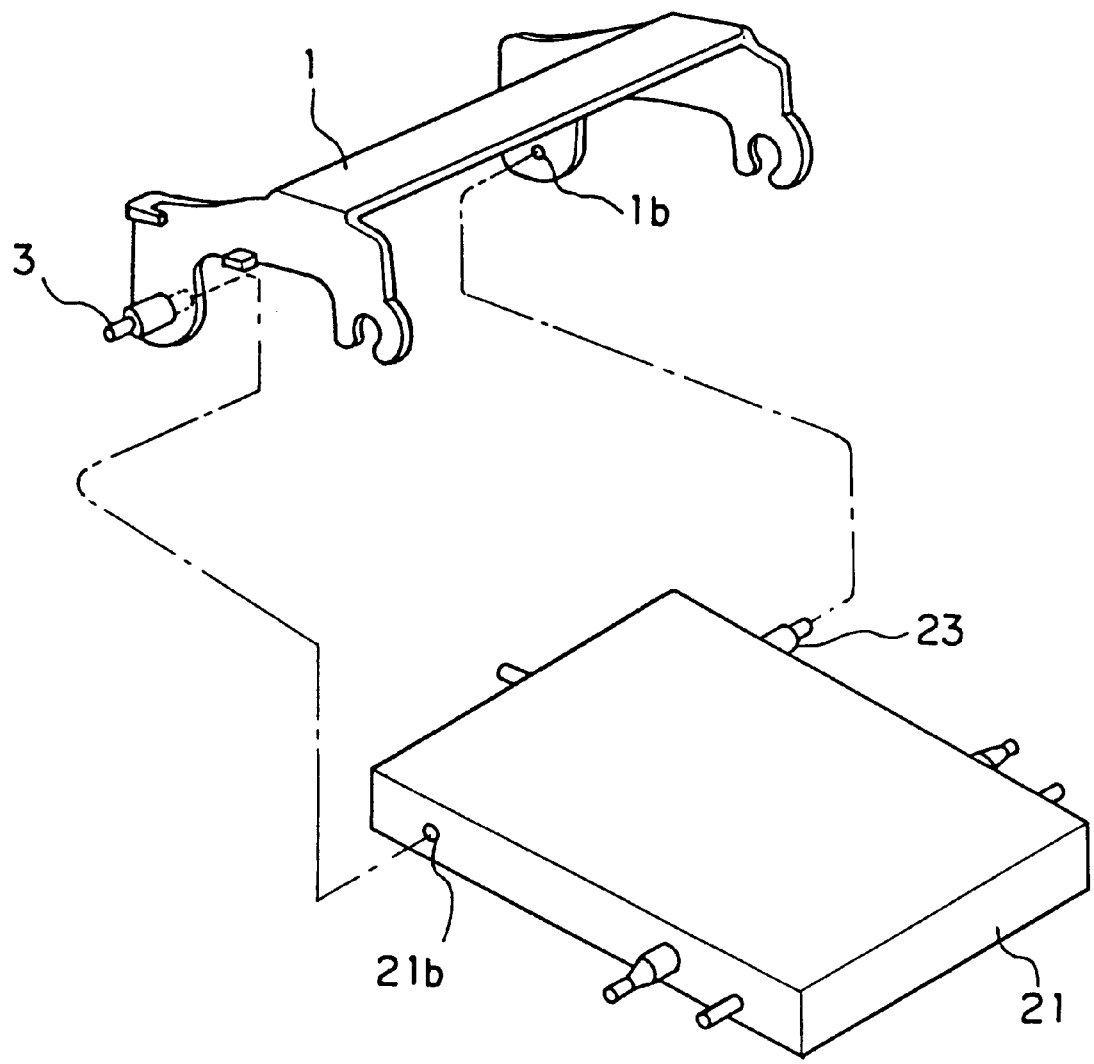
FIG. 4 is a perspective view showing the assembly of the holder arm and floating base of the disc device of the first embodiment.

Referring now to FIG. 4, it illustrates the assembly of the holder arm 1 and floating base 21. The pin 3 is integrally disposed on the holder arm 1 and the pin 23 is integrally disposed on the floating base 21. In order to mount the holder arm 1 on the floating base 21, first, the pin 23 is inserted into a corresponding hole 1b of the holder arm 1. Then, an inner-side pin of the pin 3 is inserted into a corresponding hole 21b of the floating base 21. Thus, incorporating the floating base 21 into the holder arm 1 is completed. The pins 3 and 23 serve as rotational axes. Therefore, the holder arm 1 can rotate with respect to the floating base 21. Furthermore, the pins 3 and 23 also serve as locking pins for securing the floating base 21 to the chassis 24 when no cartridge is loaded on the floating base 21.

Figure 5:
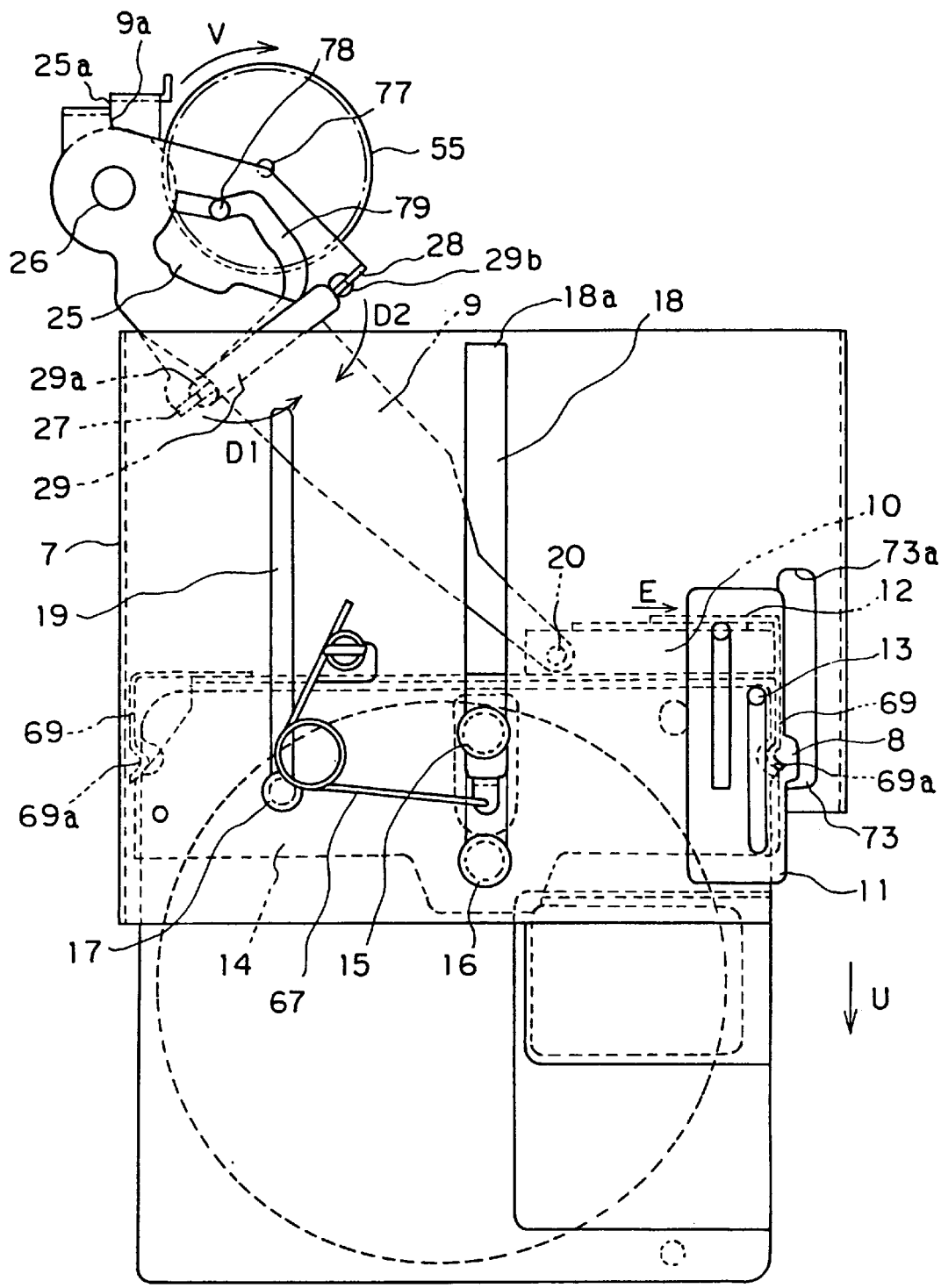
FIG. 5 is a general top view of the disc device of the first embodiment in a state wherein a disc cartridge is inserted into the holder.
Figure 6:
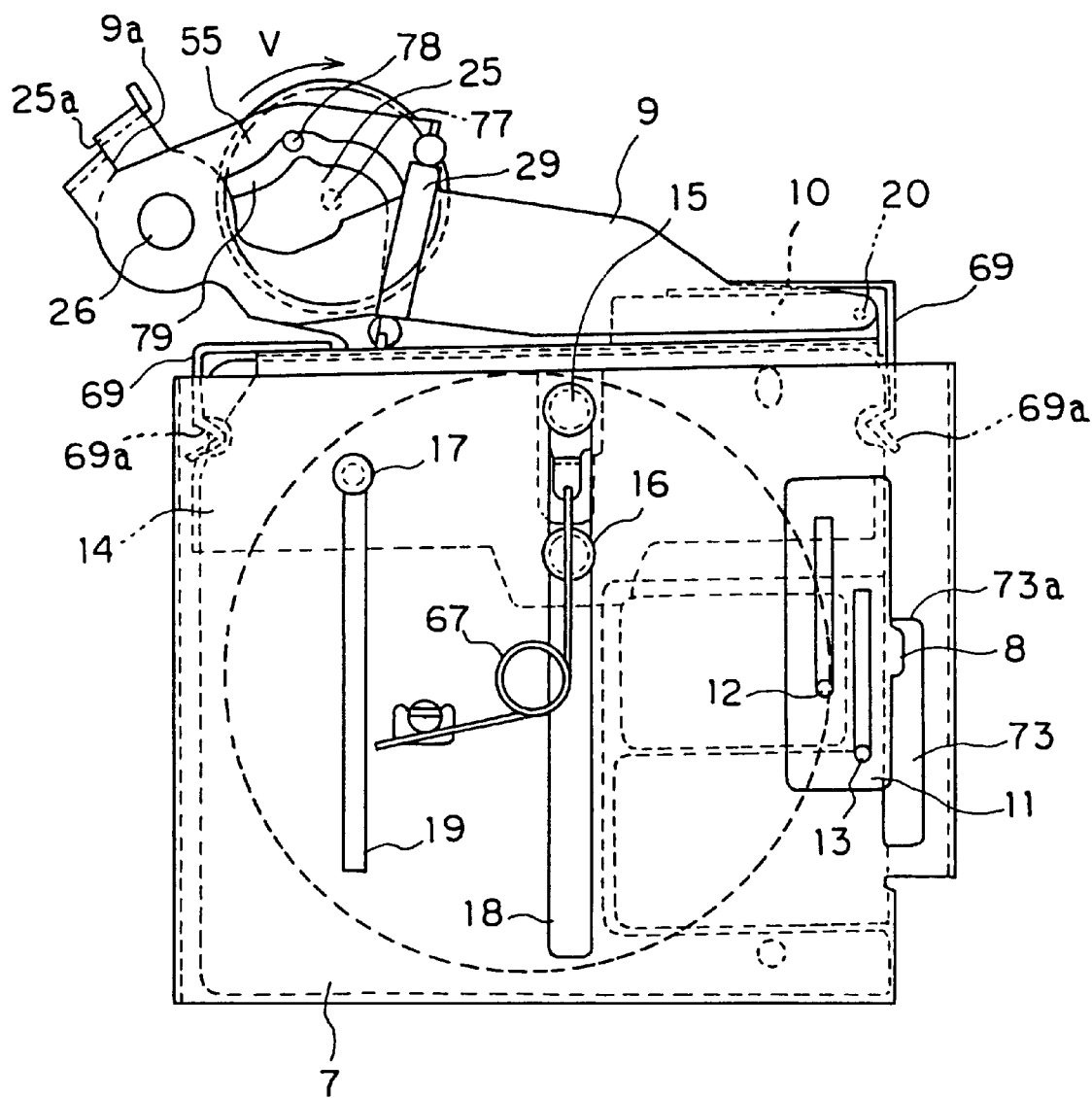
FIG. 6 is a general top view of the disc device of the first embodiment in a state wherein the disc cartridge inserted is carried to the playback position.
Figure 7:
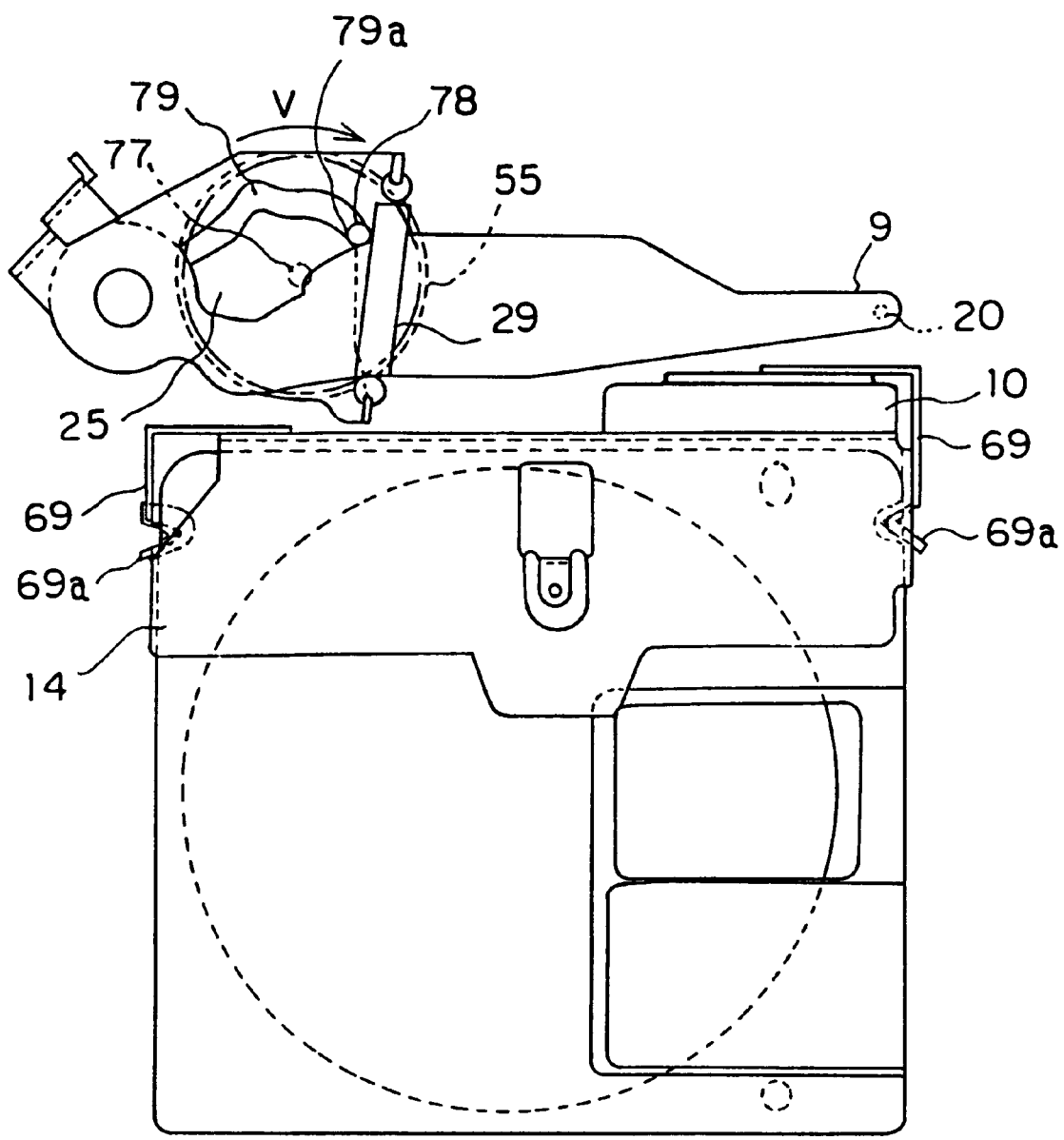
FIG. 7 is a general top view of the disc device of the first embodiment in a state wherein an ejector arm is separate from a slider disposed within the holder.

Referring now to FIGS. 5, 6, and 7, they respectively illustrate a general top view showing the disc device in a state wherein a disc cartridge is inserted into the holder 7, a general top view showing the disc device in a state wherein the disc cartridge is carried to the playback position, and a general top view showing the disc device in a state wherein the ejector arm 9 is separate from a slider 14 disposed within the holder 7. In these figures, only main components are illustrated. In FIG. 7, the holder 7 is omitted. Furthermore, in these figures, reference numeral 11 denotes a shutter opener, 8 denotes a hook disposed on one edge of the shutter opener 11 for opening the shutter of a disc cartridge inserted, and 10 denotes a groove portion disposed on the slider 14. The cross section of the groove portion is shaped like a letter U.

Figure 8A:
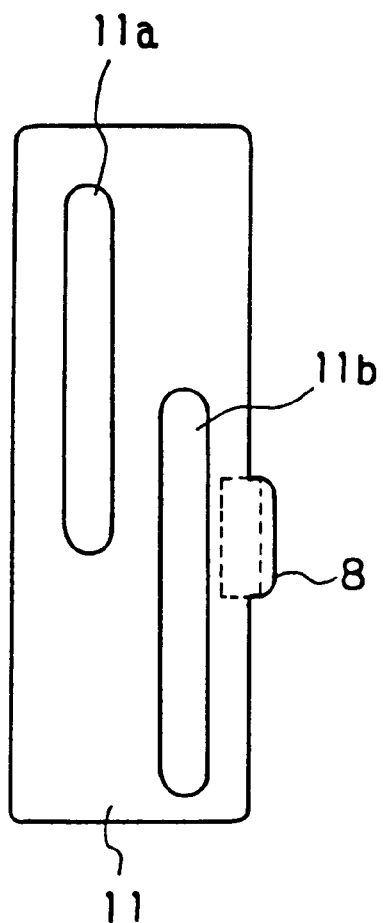
FIGS. 8a and 8b are a top view and a side view of a shutter opener slidably disposed on the holder of the disc device of the first embodiment, respectively.
Figure 8B:
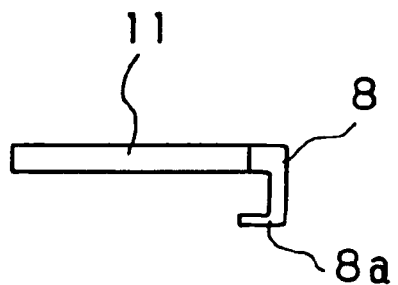

Referring now to FIGS. 8a and 8b, they respectively illustrate a top view and a side view showing the detail of the shutter opener 11 slidably disposed on the holder 7. As shown in these figures, the shutter opener 11 is provided with grooves 11a and 11b engaged with pins 12 and 13, as shown in FIG. 5, disposed on the upper surface of the holder 7. As will be mentioned later, as a disc cartridge inserted moves, the shutter opener 11 slides on the holder 7 while being guided by the pins 12 and 13. The hook 8 moves within a groove 73 of the holder during the sliding movement of the shutter opener and then comes into contact with a side wall 73a of the groove 73 at the stop position of the shutter opener. Then, the shutter opener 11 stops.

Referring now to FIGS. 9a and 9b, they respectively illustrate a top view and a side view showing the detail of the slider 14 slidably disposed within the holder 7. The slider 14 is provided with holes 150, 160, and 170 into which pins 15, 16, and 17 shown in FIGS. 5 and 6 are fitted. The slider 14 is supported within the holder 7 by means of the pins 15, 16, and 17 and is engaged with the holder 7 so that the slider can slide along guide grooves 18 and 19, formed on the upper surface of the holder 7, in the direction of inserting and discharging the disc cartridge. A pin 20 (see FIG. 5) disposed on one end part of the ejector arm 9 is adapted to slide within the groove portion 10 of the slider 14. Furthermore, there is provided a pair of slider hooks 69, each of which is constructed of an elastic body such as a plate spring, and which are fixed on the rear side surface of the slider 14 for holding a disc cartridge inserted into the slider. Bent portions 69a of the slider hooks 69 protrude inwardly so as to be engaged with the guide grooves of the disc cartridge inserted.

In FIGS. 5 to 7, reference numeral 25 denotes a spacer arm, 26 denotes an axis about which the ejector arm 9 and spacer arm 25 can rotate, 27 denotes a projecting portion, which is formed by cutting and bending, projecting from the spacer arm 25, 28 denotes a projecting portion, which is formed by cutting and bending, projecting from the ejector arm 9, and 29 denotes a spring, arm portions 29a and 29b of which are respectively engaged with the projecting portion 28 of the ejector arm 9 and projecting portion 27 of the spacer arm 25. The arm portions 29a and 29b of the spring 29 urge the projecting portions 27 and 28 in the directions indicated by the arrows D1 and D2 shown in FIG. 5, respectively.

When the ejector arm 9 and spacer arm 25 abut on each other at contact portions 9a and 25a thereof, they stop relatively. Thus, since they cannot further rotate until the angle between the arms 9 and 25 becomes larger than a predetermined angle, the minimum width of a driving gap (or a driving groove) 79 formed between the ejector arm 9 and the spacer arm 25 is ensured.

Furthermore, reference numeral 78 denotes a pin disposed on a rotary cam 55. As the rotary cam 55 rotates about an axis 77 in the direction indicated by the arrow V shown in FIG. 5, the pin 78 slides along the driving gap 79 constructed by the ejector arm 9 and spacer arm 25. The driving gap 79 is formed such that the pin 78 is loosely engaged in the gap 79 while the pin 20 is engaged in the groove portion of the slider 14, as shown in FIGS. 5 and 6. As previously mentioned, the arm portions 29a and 29b of the spring 29 urge the projecting portions 27 and 28 in the directions indicated by the arrows D1 and D2 shown in FIG. 5, respectively. Furthermore, the driving gap 79 is formed such that the width of the driving gap 79 at an end-of-travel point 79a as shown in FIG. 7 becomes narrower than the diameter of the pin 78 due to the urging force of the spring 29. As a result, the ejector arm 9 and spacer arm 25 securely holds the pin 78 of the rotary cam 55 through the gap 79 while the pin 20 of the ejector arm 9 is separate from the groove portion of the slider 14. Therefore, the ejector arm 9 and spacer arm 25 are securely connected to the rotary cam 55 via the pin 78, and hence they do not rattle.

Furthermore, reference numeral 67 denotes a twisting reversal spring which, when a disc cartridge is inserted into the slider 14 within the holder 7, as shown in FIG. 5, urges the slider 14 in the direction indicated by the arrow U so that the slider 14 abuts on a side wall of the holder 7 in the vicinity of the insertion opening.

Figure 10:
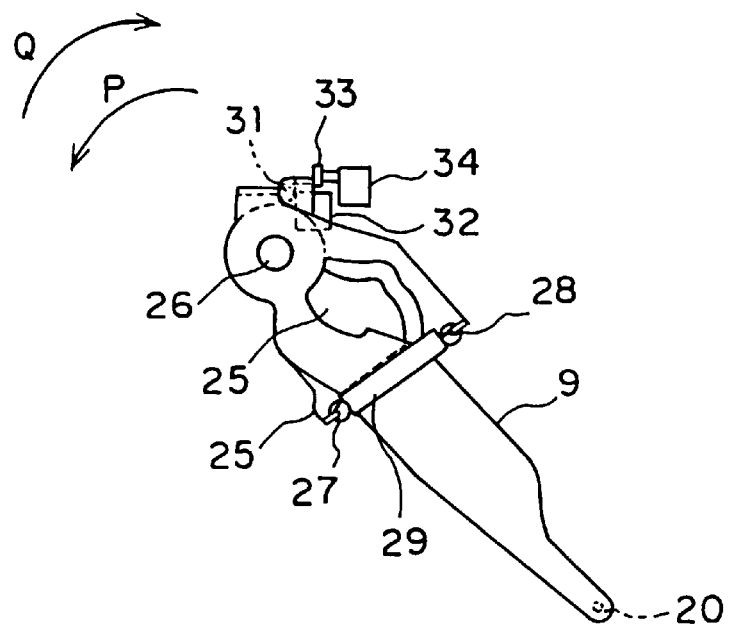
FIG. 10 is a plan view showing the ejector arm, a spacer arm, and power motor start and stop switches of the disc device of the first embodiment.

Referring now to FIG. 10, it illustrates a plan view showing a relationship between the ejector arm 9 and spacer arm 25 and switches 32 and 34. In cases where a disc cartridge can be inserted into the holder, the ejector arm 9 is positioned such that one end part 31 of the ejector arm 9 is brought into contact with the power motor start switch 32. In addition, on end part 33 of the spacer arm 25 abuts on the power motor stop switch 34. The power motor start switch 32 is adapted to be turned on when there occurs a change from the state in which it is pushed by the end part 31 of the ejector arm 9 to the state in which it is free of the pressure by the end part. That is, when the ejector arm 9 in the state shown in FIG. 10 rotates in the direction indicated by the arrow P in order to carry a disc cartridge inserted, the power motor start switch 32 is switched on. Thus, when a disc cartridge is slightly inserted into the slider by the user and then the ejector arm 9 rotates slightly, the power motor start switch 32 is switched on with result that the power motor 56 is started. The power motor stop switch 34 is adapted to stop the power motor 56 when it is pushed by the end part 33 of the spacer arm 25. That is, when the ejector arm 9 rotates in the direction indicated by the arrow Q in order to discharge the disc cartridge and then reaches the state as shown in FIG. 10, the power motor stop switch 34 is switched on so as to stop the power motor 56.

Figures 11A, 11B:
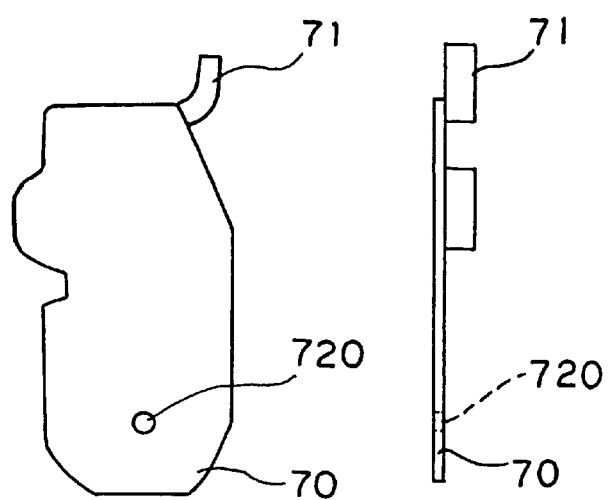
FIGS. 11a and 11b are a plan view and a side view of a cartridge insertion detecting member of the disc device of the first embodiment, respectively.
Figure 12:
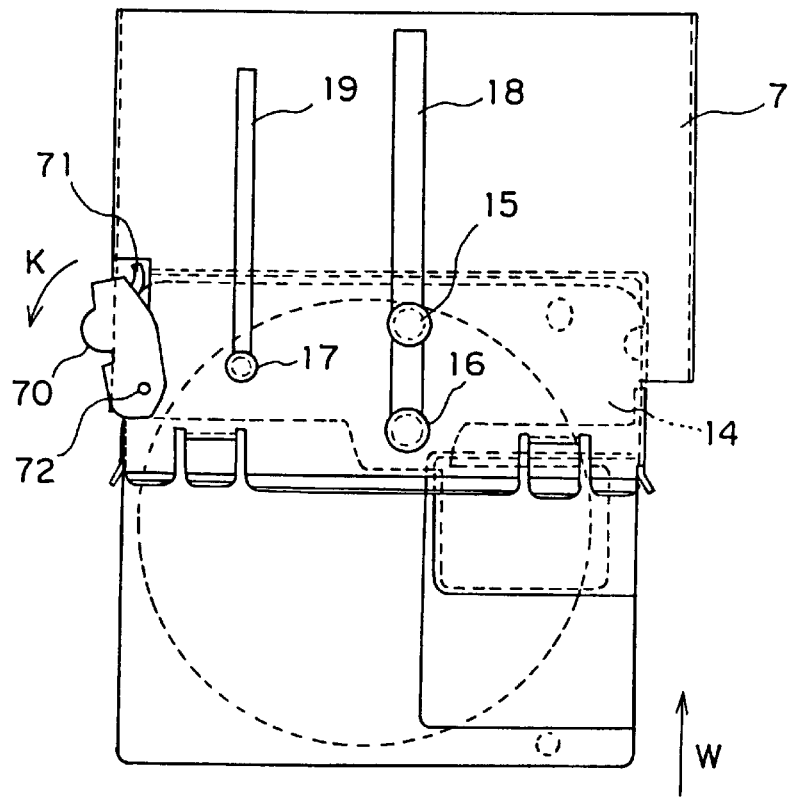
FIG. 12 is a general plan view showing the disc device of the first embodiment in a state wherein a disc cartridge is correctly inserted into the slider.
Figure 13:
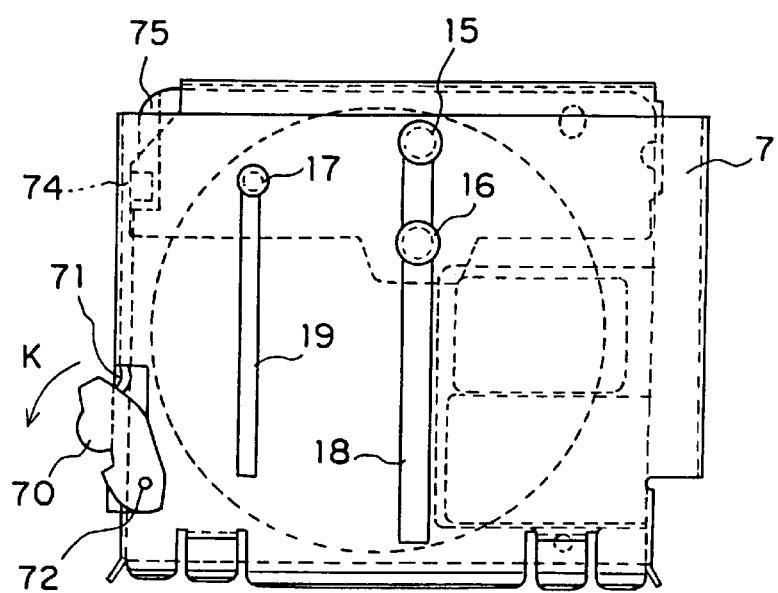
FIG. 13 is a general plan view showing the disc device of the first embodiment in a state wherein a disc cartridge is correctly inserted into the slider and the cartridge is further carried into the holder.
Figure 14:
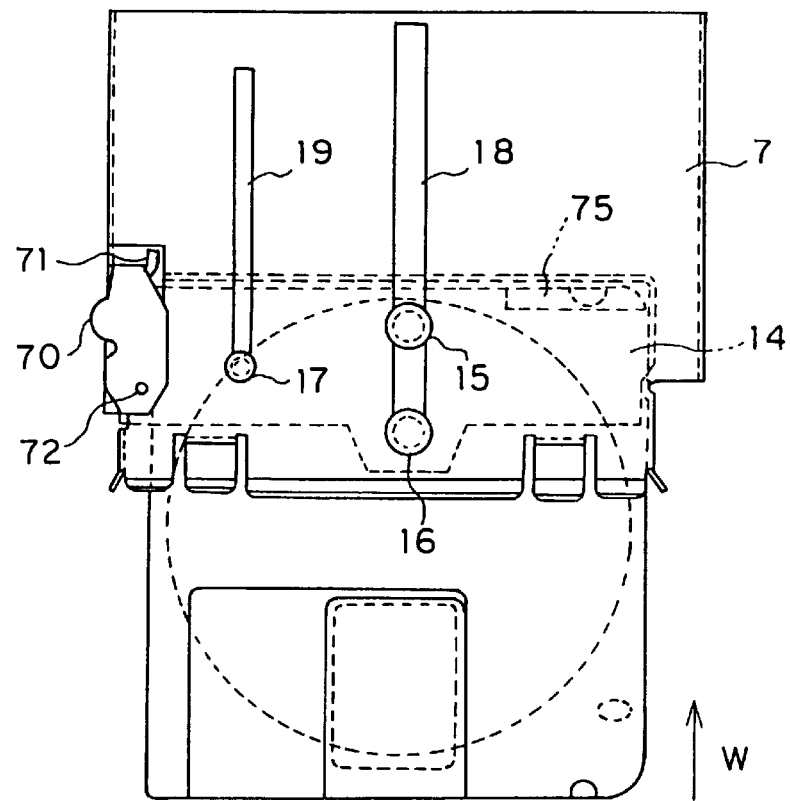
FIG. 14 is a general plan view showing the disc device of the first embodiment in a state wherein a disc cartridge is incorrectly inserted into the slider.
Figure 15:
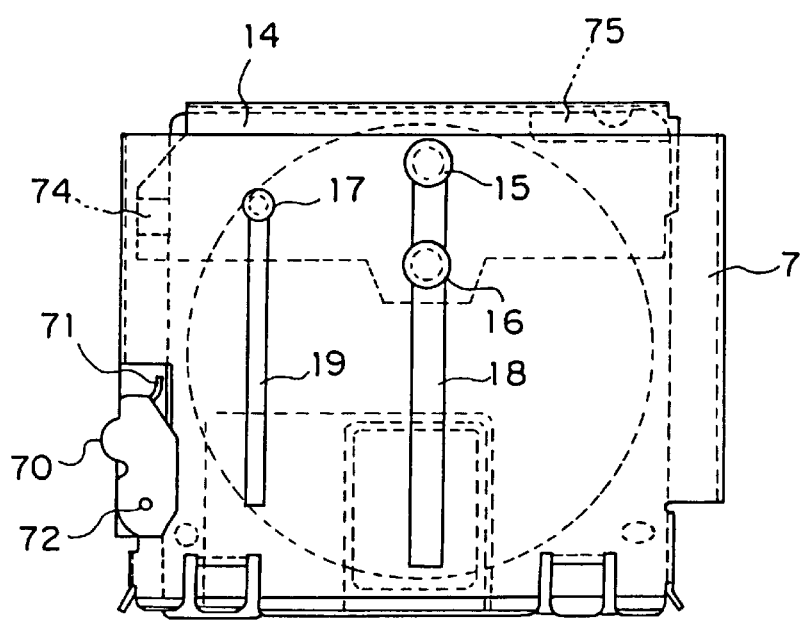
FIG. 15 is a general plan view showing the disc device of the first embodiment in a state wherein a disc cartridge is incorrectly inserted into the slider and the cartridge is further carried into the holder.

Next, a description will be made as to a mechanism for preventing wrong insertion of a disc cartridge. FIGS. 11a and 11b respectively show a plan view and a side view of a cartridge insertion detecting member. FIGS. 12 and 13 are plan views showing the holder in the state wherein a disc cartridge is correctly inserted. FIGS. 14 and 15 are plan views showing the holder in the state wherein a disc cartridge incorrectly oriented is inserted. In these figures, reference numeral 70 denotes a switch lever disposed as the cartridge insertion detecting member which can pivot in the direction indicated by the arrow K in FIG. 12 and then can abut on a switch not shown in the figure, 71 denotes a contact portion of the cartridge insertion detecting member 70, which can come into contact with a disc cartridge inserted, 72 denotes a pin about which the cartridge insertion detecting member 70 can pivot, an 720 denotes a hole formed in the cartridge insertion detecting member 70, which the pin 72 penetrates. Furthermore, reference numeral 74 denotes a wrong-insertion preventing lug formed in the slider 14 for preventing wrong insertions. As shown in FIG. 13, when a disc cartridge normally oriented is inserted into the holder 7, the wrong-insertion prevention lug 74 is fitted into the groove 75 of the disc cartridge inserted. The switch lever 70 is pivotably attached on the holder 7 and is located behind and outside the end part of the wrong-insertion preventing lug 74, when viewed from the insertion opening through which a disc cartridge is inserted, so that the contact portion 71 projecting from the switch lever 70 can be brought into contact with a corner of the disc cartridge inserted correctly.

As shown in FIGS. 11a and 11b, the contact portion 71 of the cartridge insertion detecting member 70 is bent such that it easily comes into contact with the left side corner of the front of a disc cartridge inserted. Since the wrong-insertion preventing lug 74 is fitted into the groove 75 when a disc cartridge is correctly inserted in the direction indicated by the arrow W, the contact portion 71 of the cartridge insertion detecting member 70 is brought into contact with the cartridge and then pivots about the pin 72 in the direction indicated by the arrow K, as shown in FIGS. 12 and 13. As a result, the cartridge detection switch is switched on.

On the contrary, as shown in FIGS. 14 and 15, when a disc cartridge, which is turned 90 degrees and is therefore oriented incorrectly, is inserted into the holder 7 by mistake, the wrong-insertion preventing lug 74 is brought into contact with a side edge of the disc cartridge having no groove into which the wrong-insertion preventing lug 74 can be fitted. The inserted disc cartridge cannot move on the left side within the slider 14 because the wrong-insertion preventing lug 74 obstructs the cartridge. Therefore, when a disc cartridge oriented incorrectly is inserted, the disc cartridge cannot pull toward the cartridge insertion detecting member 70. As a result, since the end portion 71 cannot be brought into contact with a corner of the disc cartridge inserted and hence the cartridge insertion detecting member 70 cannot rotate, the detection switch is not switched on. Since the power motor 56 is not activated unless the detection switch is switched on, such a wrong-orientation insertion of a disc cartridge does not cause the next disc cartridge inserting operation.

Figure 16:
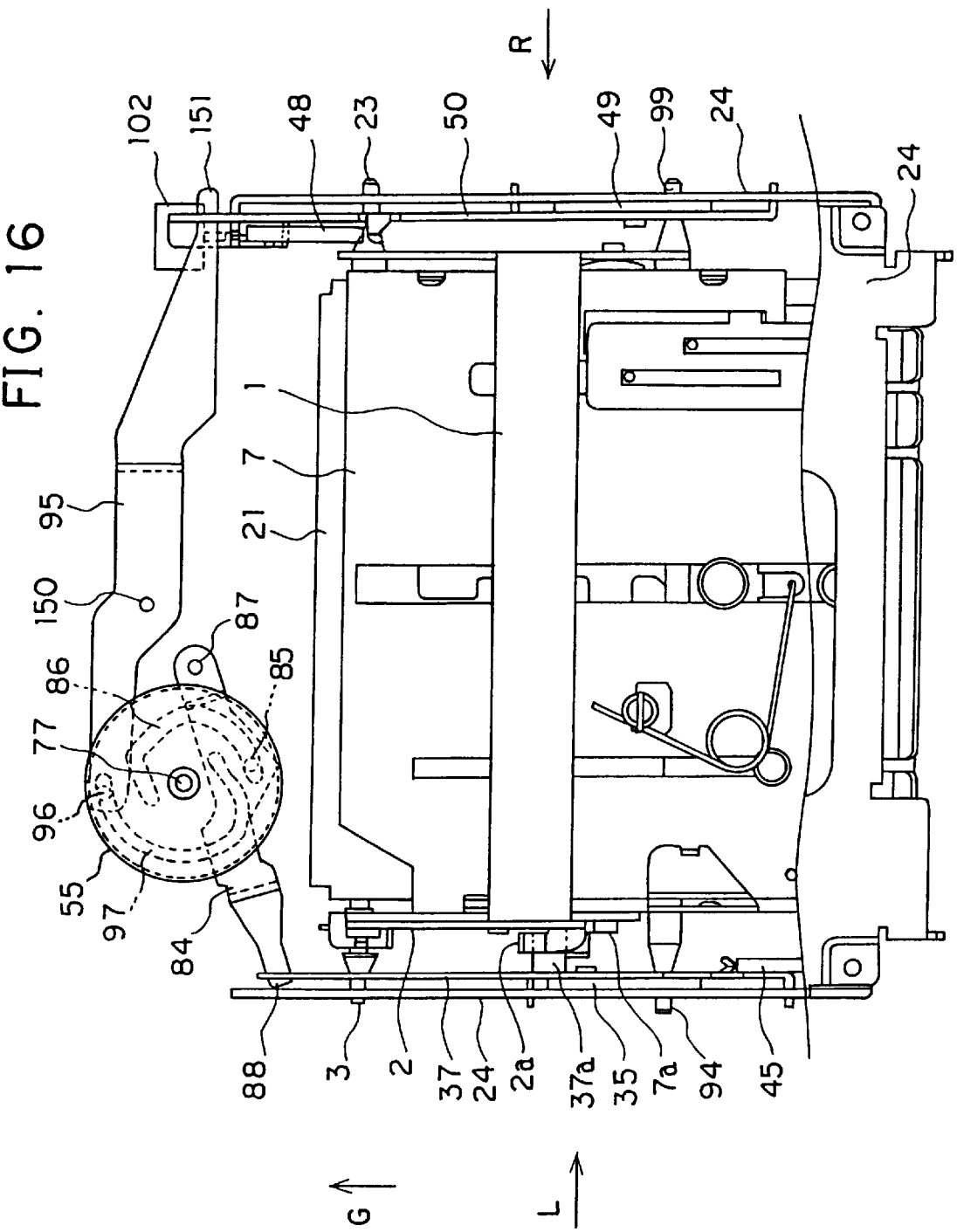
FIG. 16 is a general top view showing of the disc device of the first embodiment in a state wherein the floating base is locked.
Figure 17:
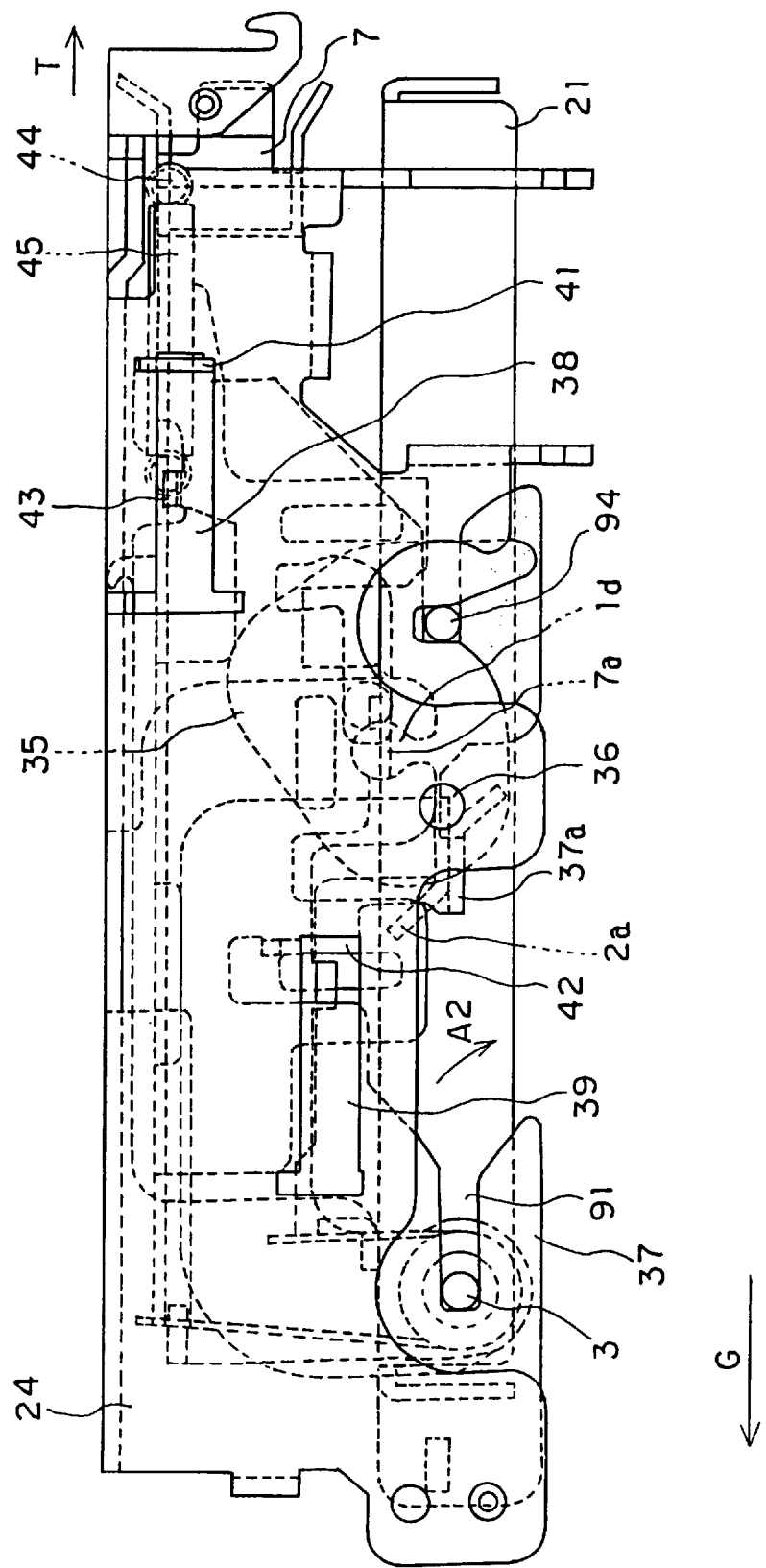
FIG. 17 is a left side view of the disc device when viewed from the direction indicated by the arrow L in FIG. 16.
Figure 18:
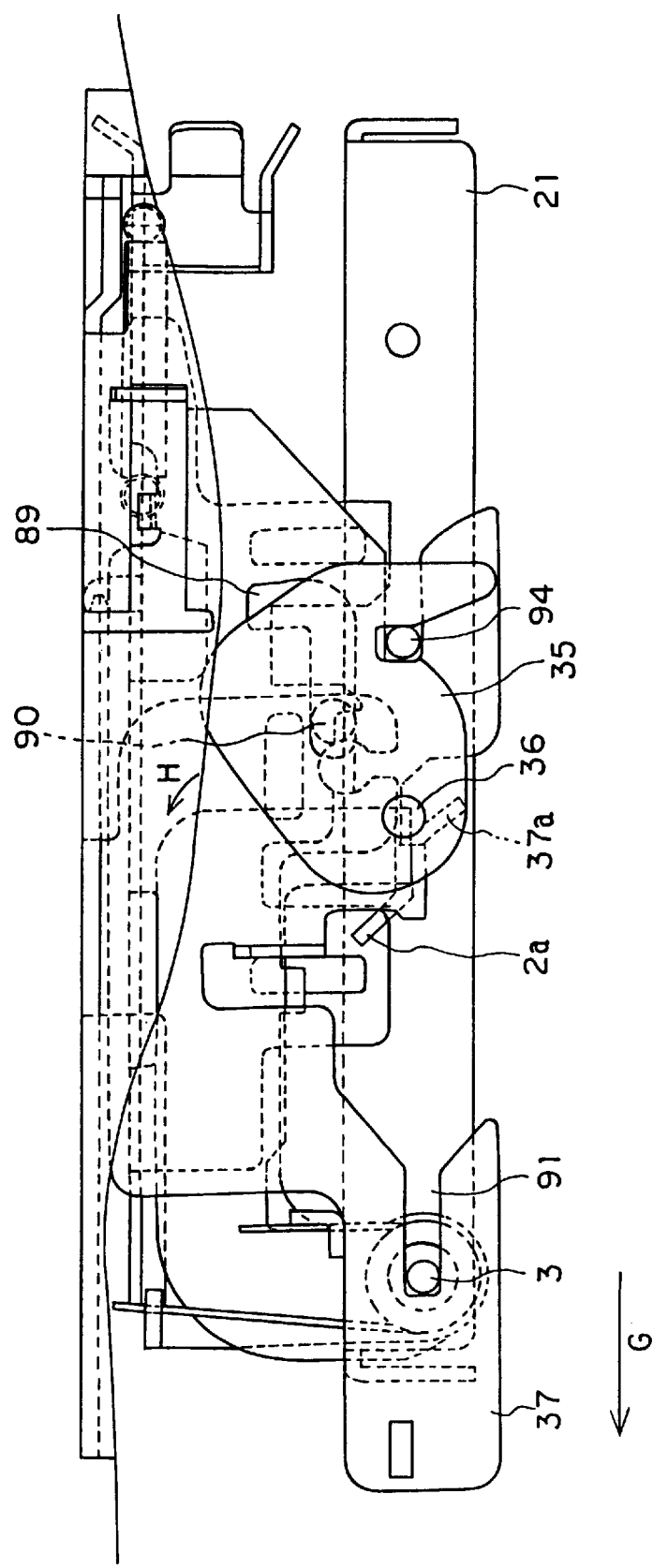
FIG. 18 is a partially cutaway view of the left side view of FIG. 17.
Figure 19:
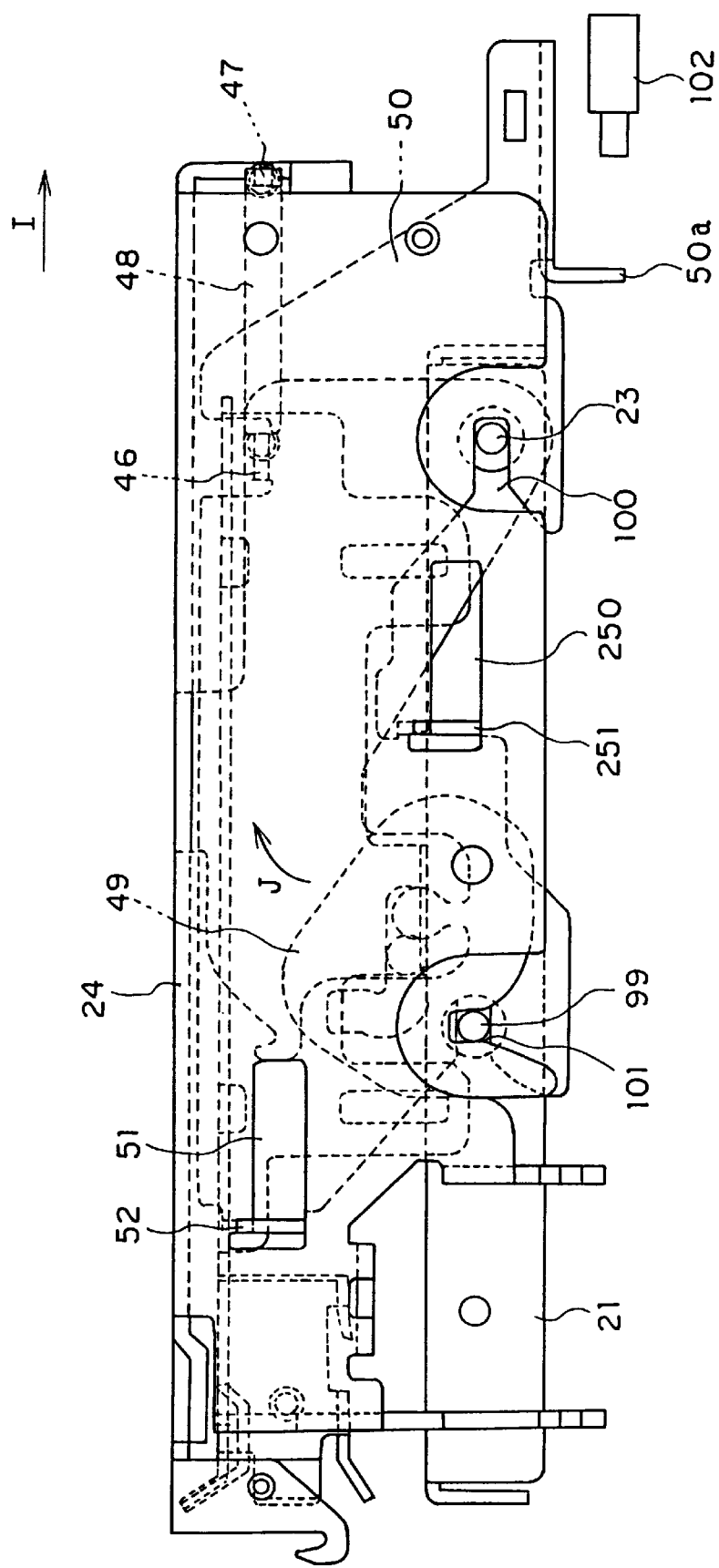
FIG. 19 is a right side view of the disc device when viewed from the direction indicated by the arrow R in FIG. 16.
Figure 20:
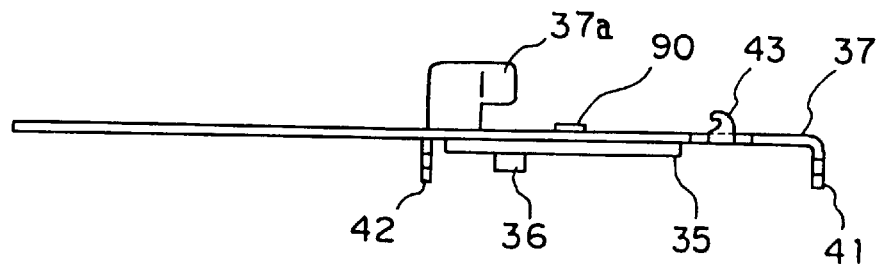
FIG. 20 is a plan view showing a slide plate and a locking plate which are integral parts of the floating base locking mechanism of the first embodiment.
Figure 21:
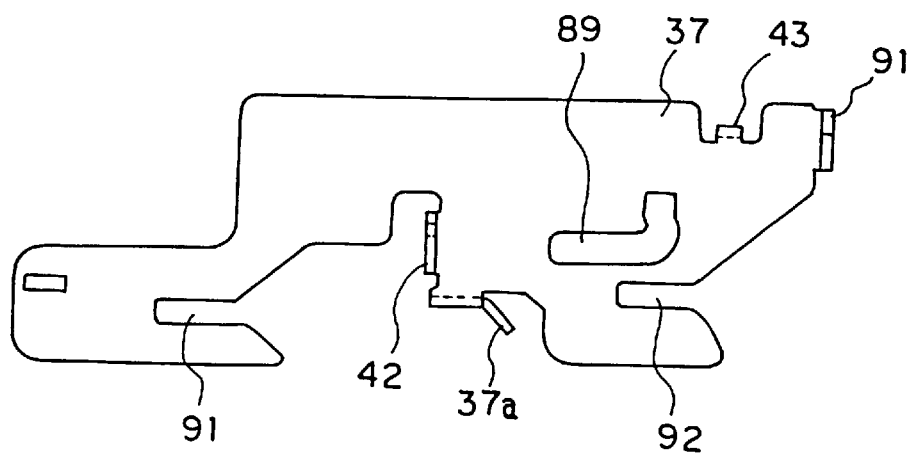
FIG. 21 is an elevational view of the slide plate shown in FIG. 20.
Figure 22:
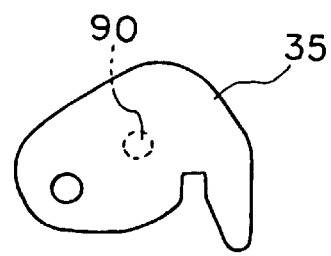
FIG. 22 is an elevational view of the locking arm shown in FIG. 20.
Figure 23:
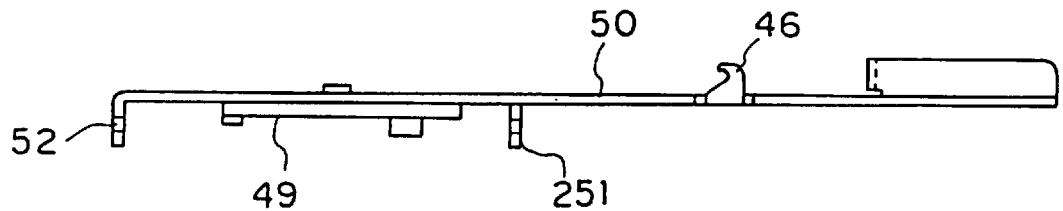
FIG. 23 is a plan view showing another slide plate and another locking arm which are integral parts of the floating base locking mechanism of the first embodiment.
Figure 24:
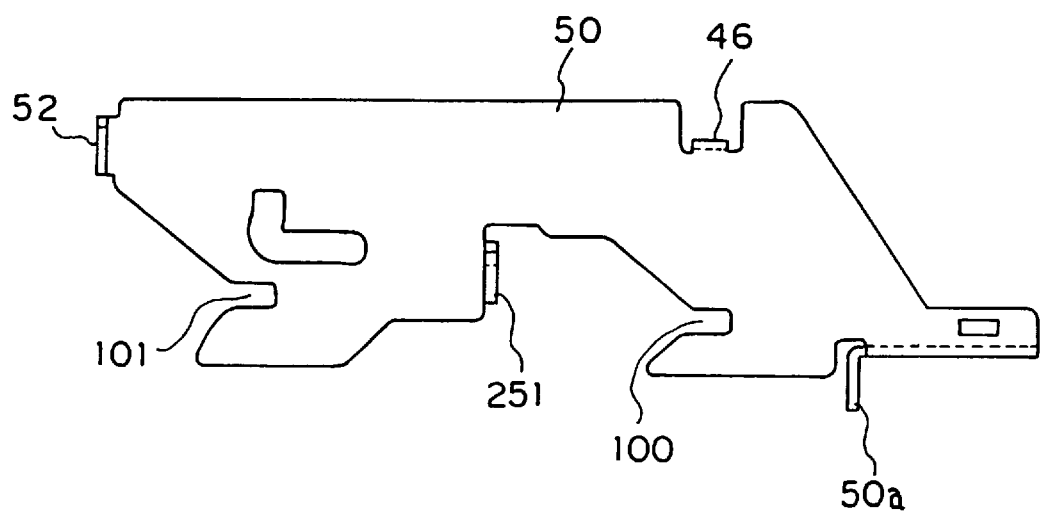
FIG. 24 is an elevational view of the other slide plate.
Figure 25:
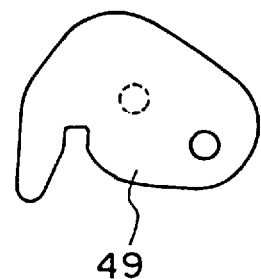
FIG. 25 is an elevational view of the other locking arm.

Next, the description will be directed to the floating base locking mechanism. FIG. 16 shows a general top view of the disc device in a state wherein the floating base is locked by the floating base locking mechanism, FIG. 17 shows a left side view of the disc device when viewed from the direction indicated by the arrow L in FIG. 16, FIG. 18 shows a partially cutaway view showing the inside of the chassis shown in FIG. 17, and FIG. 19 shows a right side view of the disc device when viewed from the direction indicated by the arrow R in FIG. 16. FIG. 20 shows a plan view showing a slide plate 37 and a locking arm 35 which are integral parts of the floating base locking mechanism, FIG. 21 shows an elevational view of the slide plate 37, and FIG. 22 shows an elevational view of the locking arm 35. Furthermore, FIG. 23 shows a plan view showing a slide plate 50 and a locking arm 49 which are integral parts of the floating base locking mechanism, FIG. 24 shows an elevational view of the slide plate 50, and FIG. 25 shows an elevational view of the locking arm 49.

In FIG. 16, reference numeral 84 denotes a link which rotates about an axis 87 as the rotary cam 55 rotates, one end part 88 of the link 84 being engaged with the slide plate 37, 85 denotes a pin fixed on the link 84 and engaged with a groove 86 formed in the rotary cam 55, 95 denotes a link which rotates about an axis 150 as the rotary cam 55 rotates, one end part 151 of the link 95 being engaged with the slide plate 50, and 96 denotes a pin fixed on the link 95 and engaged with a groove 97 formed in the rotary cam 55.

The locking arm 35 is adapted to rotate about an axis 36 disposed as a supporting axis which penetrates a hole in one side wall of the chassis 24, as shown in FIG. 17. The slide plate 37 is provided with bent portions 41 and 42 (see FIGS. 20 and 21) which are slidably engaged with grooves 38 and 39 formed in the side wall of the chassis 24, respectively. Therefore, the slide plate 37 can slide forward and backward in the direction indicated by the arrow G and vice versa with respect to the chassis 24. For example, when the rotary cam 55 in the state as shown in FIG. 16 rotates in the clockwise direction, the pin 85 moves along the groove 86 and hence the slide plate 37 slides in the direction indicated by the arrow G with respect to the chassis 24. While the disc device is in the state as shown in FIGS. 16 to 18, the slide plate 37 is locking the floating base 21 by securing the pins 3 and 94 by means of locking grooves 91 and 92. Furthermore, a spring 45 connected between the bent portion 43 of the slide plate 37 and a projecting portion 44 of the chassis 24, which is formed by cutting and bending, urges the slide plate 37 in the direction of locking the floating base 21 (the direction indicated by the arrow T in FIG. 17).

Furthermore, reference numeral 89 denotes a L-shaped groove formed on the slide plate 37, and 90 denotes a pin which is fixed on the locking arm 35 and is engaged in the groove 89. Thus, the locking arm 35 rotates about the axis 36 as the slide plate 37 slides.

As shown in FIGS. 19 and 24, the other slide plate 50 disposed on the opposite side of the floating base 21 is also provided with bent portions 52 and 251 which are slidably engaged with grooves 51 and 250 formed in another side wall of the chassis 24, respectively. Thus, the slide plate 50 can slide forward and backward with respect to the chassis 24. Furthermore, a spring 48 is connected between the bent portion 46 of the slide plate 50 and a projecting portion 47 of the chassis 24, which is formed by cutting and bending. The spring 48 urges the slide plate 50 in the direction of unlocking the floating base 21 (the direction indicated by the arrow I in FIG. 19). Accordingly, the slide plates 37 and 50 are respectively urged in the directions of locking and unlocking the floating base 21, i.e., in opposite directions.

Figure 26:
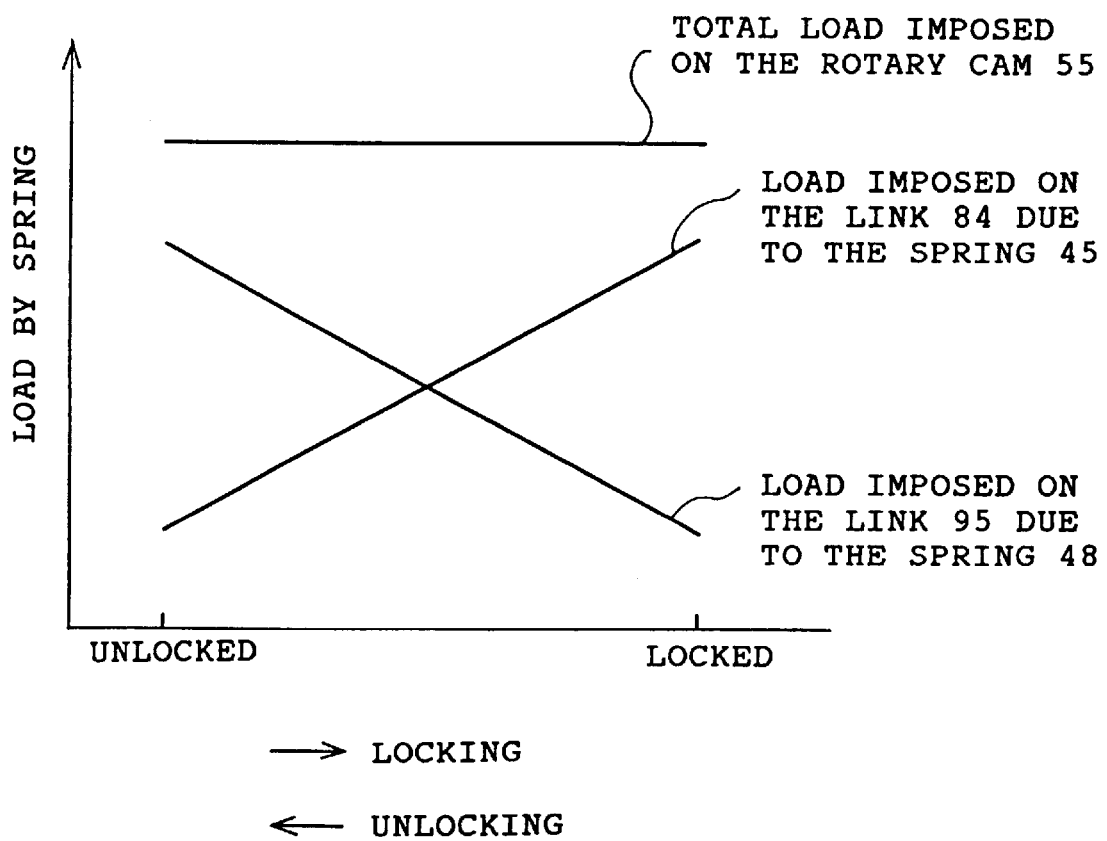
FIG. 26 is a graph showing a load imposed on a rotary cam when locking and unlocking the floating base.

Referring now to FIG. 26, it illustrates a graph showing a load imposed on the rotary cam 55 when locking and unlocking the floating base 21. When locking the floating base 21, a load imposed on the link 95 due to the spring 48 is decreased as the slide plate 50 slides. On the other hand, a load imposed on the link 84 due to the spring 45 is increased as the slide plate 37 slides. When unlocking the floating base 21, a load imposed on the link 95 due to the spring-48 is increased as the slide plate 50 slides. On the other hand, a load imposed on the link 84 due to the spring 45 is decreased as the slide plate 37 slides.

Thus, the driving force required for the rotary cam 55 to drive the pair of the slide plates 37 and 50 when locking the floating base 21 can be the same as that required for the rotary cam 55 when unlocking the floating base 21. That is, the driving force required for the rotary cam 55 to drive the pair of slide plates can be nearly constant. As a result, the pins 85 and 96 can slide smoothly within the grooves 86 and 97 of the rotary cam 55. Furthermore, the maximum driving force required of the power motor 56 can be reduced.

As shown in FIGS. 24 and 25, an L-shaped groove is formed on the slide plate 50, and a pin engaged with the groove is fixed on the locking arm 49. The locking arm 49 rotates about an axis thereof as the slide plate 50 slides on the chassis 24.

Figure 27:
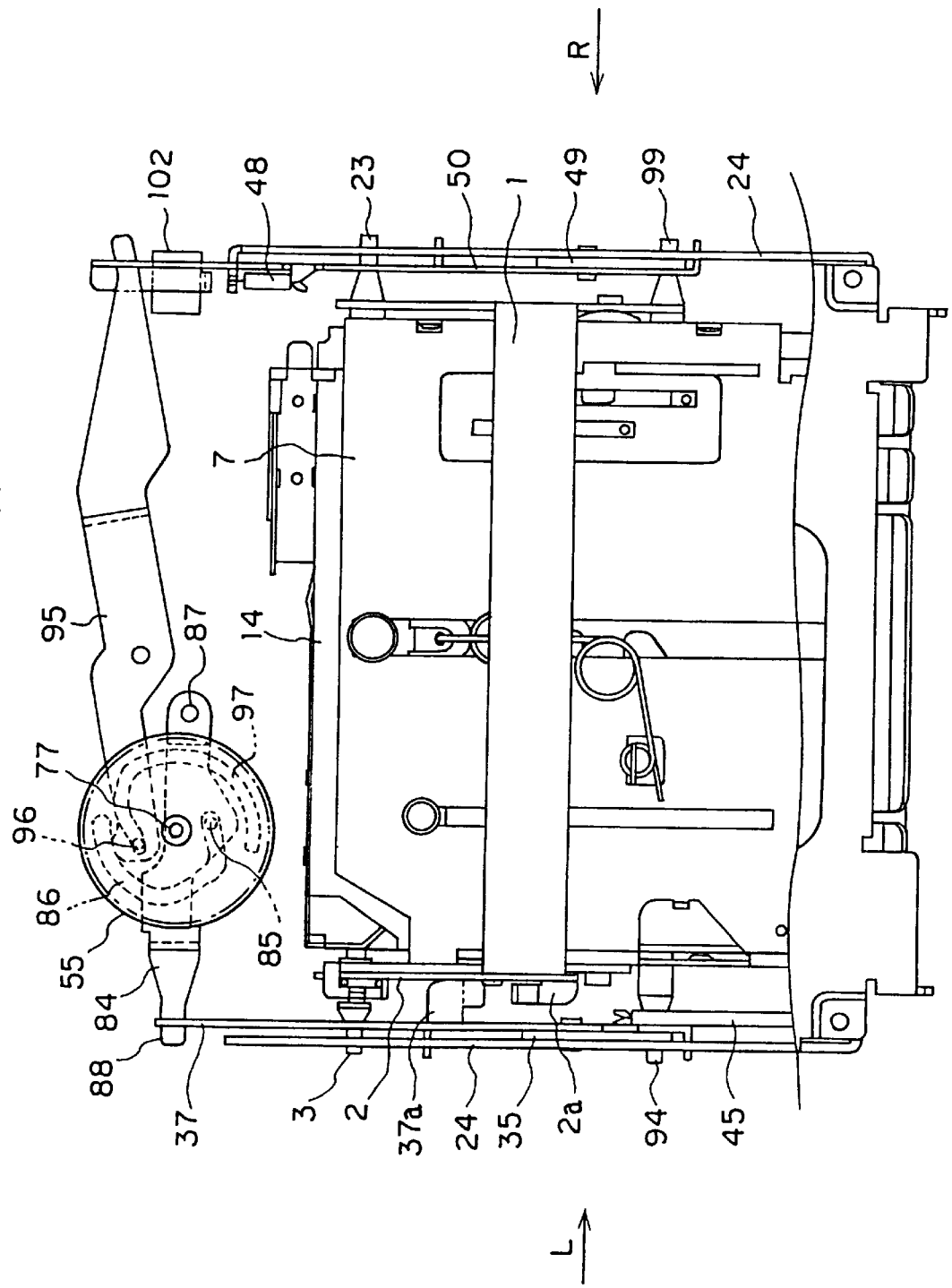
FIG. 27 is a general top view showing the disc device of the first embodiment in a state wherein the floating base is unlocked and the holder is moved down toward the floating base.
Figure 28:
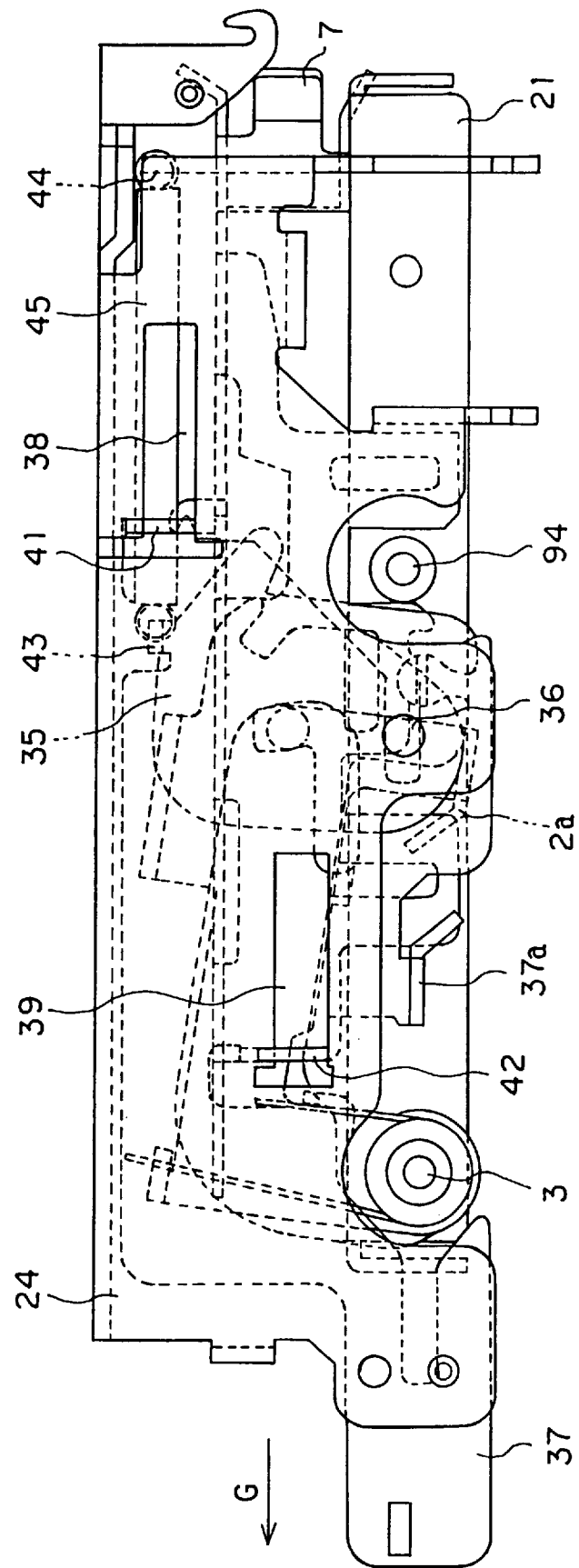
FIG. 28 is a left side view of the disc device when viewed from the direction indicated by the arrow L in FIG. 27.
Figure 29:
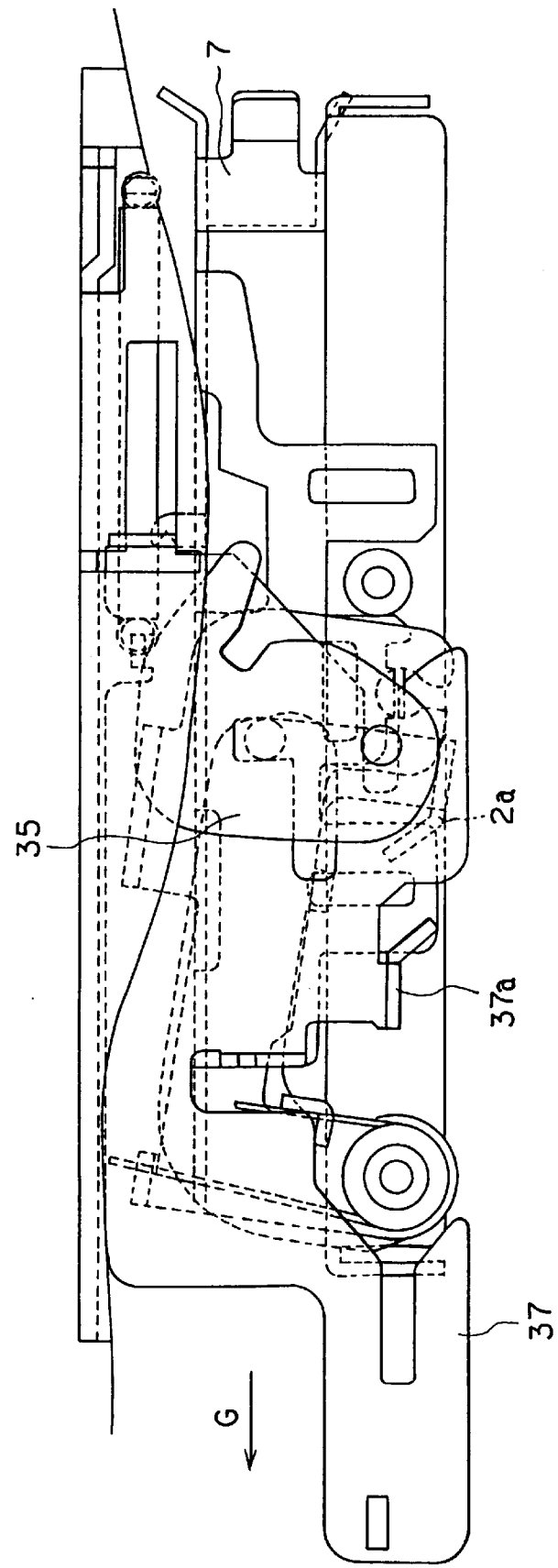
FIG. 29 is a partially cutaway view of the left side view of FIG. 28.
Figure 30:
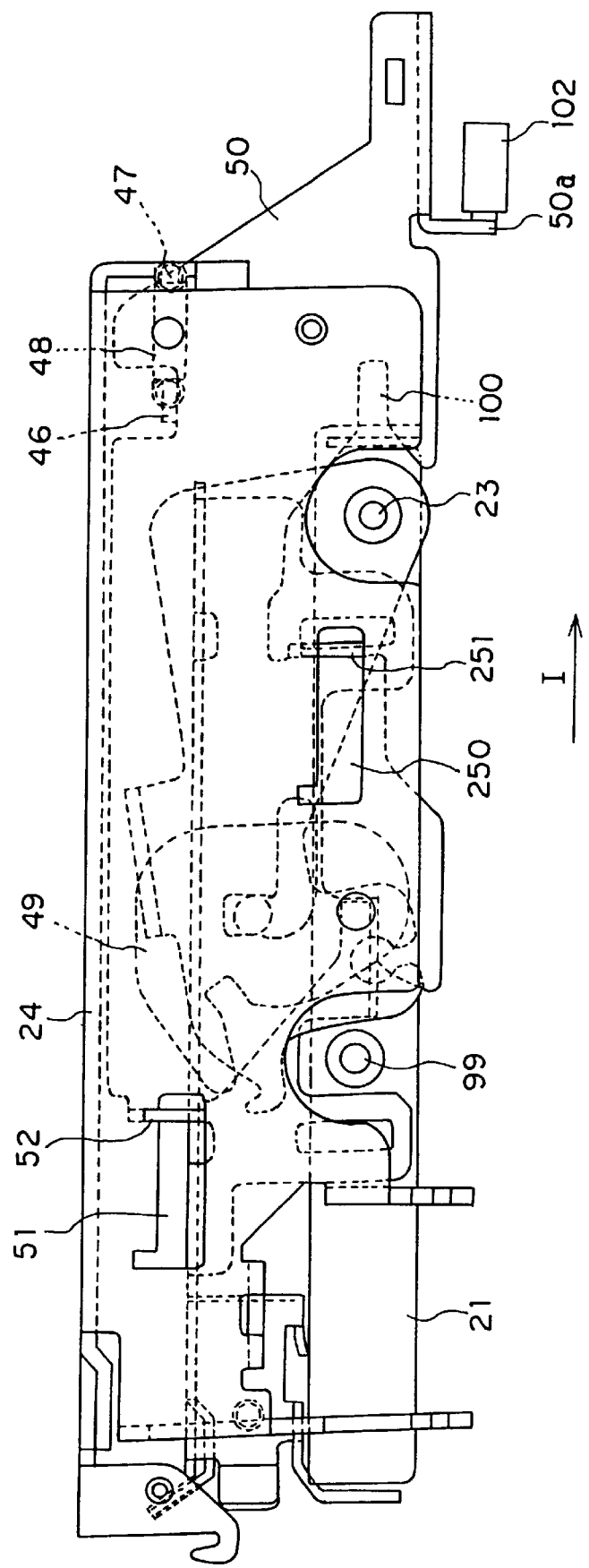
FIG. 30 is a right side view of the disc device when viewed from the direction indicated by the arrow R in FIG. 27.

Referring now to FIG. 27, it illustrates a general top view showing the disc device in the state wherein the floating base 21 is unlocked and the holder 7 is moved downward to the floating base 21. Furthermore, FIG. 28 shows a left side view of the disc device when viewed from the direction indicated by the arrow L in FIG. 27, FIG. 29 shows a partially cutaway view showing the inside of the chassis shown in FIG. 28, and FIG. 30 shows a left side view of the disc device when viewed from the direction indicated by the arrow R in FIG. 27. When the slide plate 37 slides in the direction indicated by the arrow G with respect to the chassis 24, as shown in FIGS. 28 and 29, the engagement between an inclined portions 37a of the slide plate 37 and the inclined portion 2a of the side arm 2 is released and hence the holder 7 descends toward the floating base 21. Furthermore, the pins 3, 94, 23, and 99 are unlocked and then the floating base 21 changes into the floating state.

Figure 31:
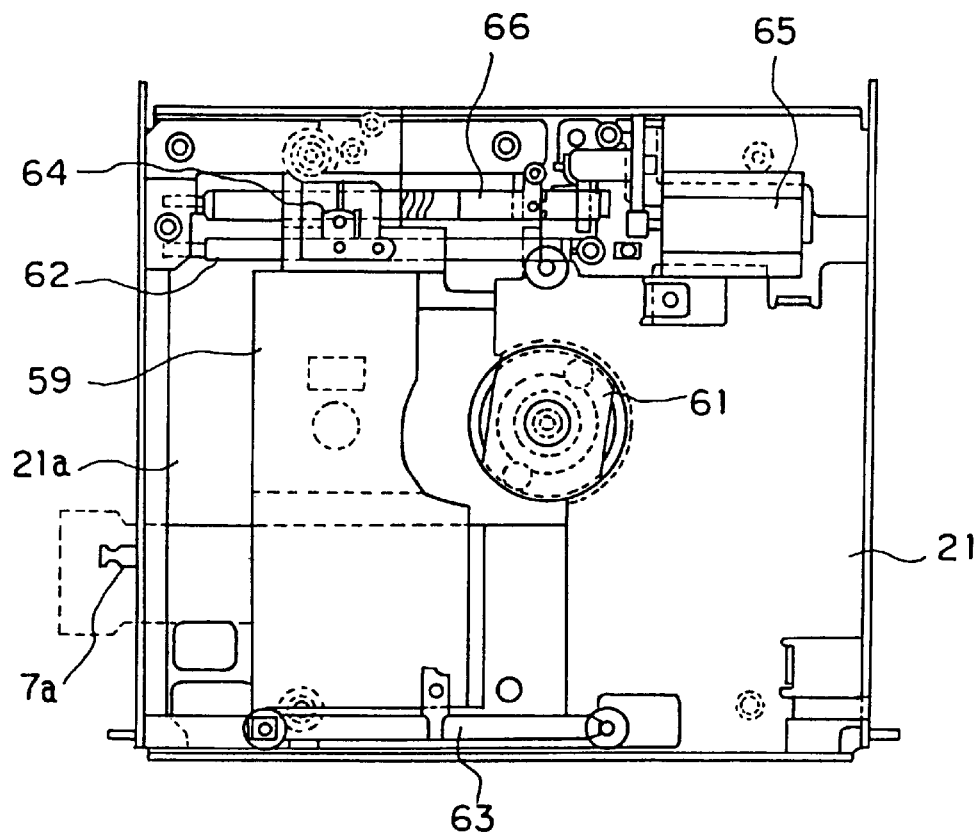
FIG. 31 is a bottom view showing the floating base on which a pickup is disposed.
Figure 32:
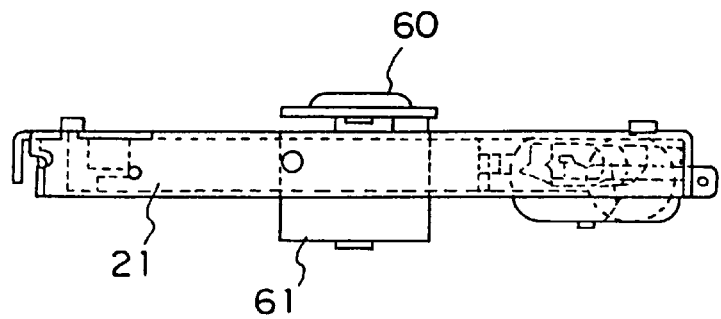
FIG. 32 is a side view of the floating base shown in FIG. 31.

Next, a description will be made as to the pickup moving mechanism. FIG. 31 shows a bottom view showing the pickup mounted in the floating base 21, and FIG. 32 shows a side view of the floating base 21 of FIG. 31. A turn table 60 is disposed in the vicinity of the center of the floating base 21. The turn table 60 which is adapted to support and turn the disc within a disc cartridge inserted into the holder is driven and rotated by a motor 61 disposed on the bottom surface of the floating base 21. The pickup 59 is disposed within a cutaway portion 21a of the floating base 21. The pickup 59 is slidably supported by guide shafts 62 and 63 and is provided with a guide portion 64 engaged with the threads of a shaft 66 which can be rotated by a motor 65 disposed as a driving source. As the shaft 66 rotates, the guide portion 64 moves on the shaft 66. Thus, the pickup 59 moves forward or backward in the radial direction of the disc loaded on the turn table 60.

Figure 33:
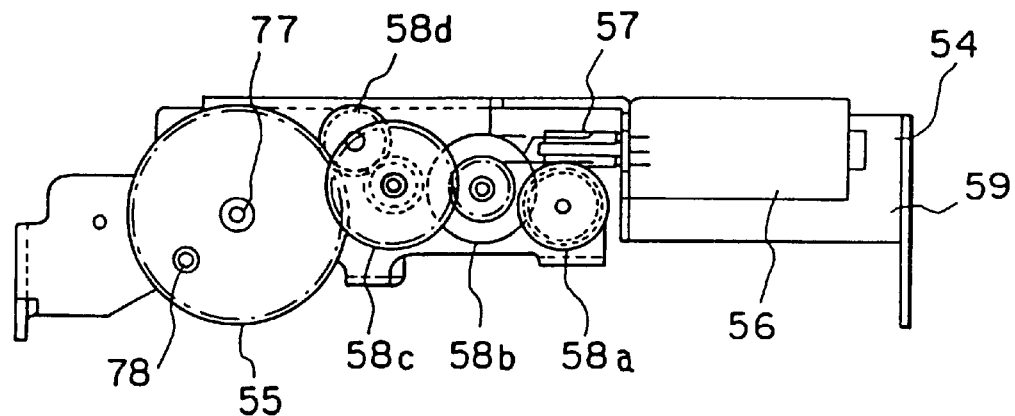
FIG. 33 is a plan view showing peripheral components of a power motor of the disc device of the first embodiment.

Next, a description will be made as to the power motor peripheral mechanism. FIG. 33 shows a plan view showing peripheral components of the power motor 56 for rotating the rotary cam 55. A worm gear 57 pressed into the power motor 56 which is placed on a motor base 54 fixed on the chassis 24 is engaged with the rotary cam 55 at the final stage by way of reduction gears 58a, 58b, 58c, and 58d. That is, the driving force of the power motor 56 is transmitted to the reduction gears 58a, 58b, 58c, and 58d through the worm gear 57 and finally to the rotary cam 55. Then, the rotary cam 55 to which the driving force is transmitted rotates about the axis 77, and this results in causing the pin 78 to slide along the driving groove 79 formed by the ejector arm 9 and spacer arm 25, as shown in FIG. 5. Furthermore, the rotary cam 55 is adapted to cause the pins 85 and 96 to slide along the grooves 86 and 97 formed on the rotary cam 55, as shown in FIG. 16.

Next, the description will be directed to the operation of each of the aforementioned mechanisms of the disc device. When the user inserts a disc cartridge into the disc device, usually, the pair of the bent portions 69a of the pair of slider hooks 69 are engaged with a corresponding pair of grooves of the disc cartridge. Thus, the disc cartridge is set in the slider 14 slidably disposed within the holder 7. In such a state wherein a disc cartridge inserted into the disc device has not been carried yet, the pin 20 of the ejector arm 9 is in contact with the inner wall of the groove 10 of the slider 14, as shown in FIG. 5. In this case, the slider 14 is urged in the direction indicated by the arrow U by the twisting reversal spring 67 so as to abut on a side wall of the holder 7 in the vicinity of the insertion opening. Thus, the rattle of the slider 14 can be prevented.

Figure 34:
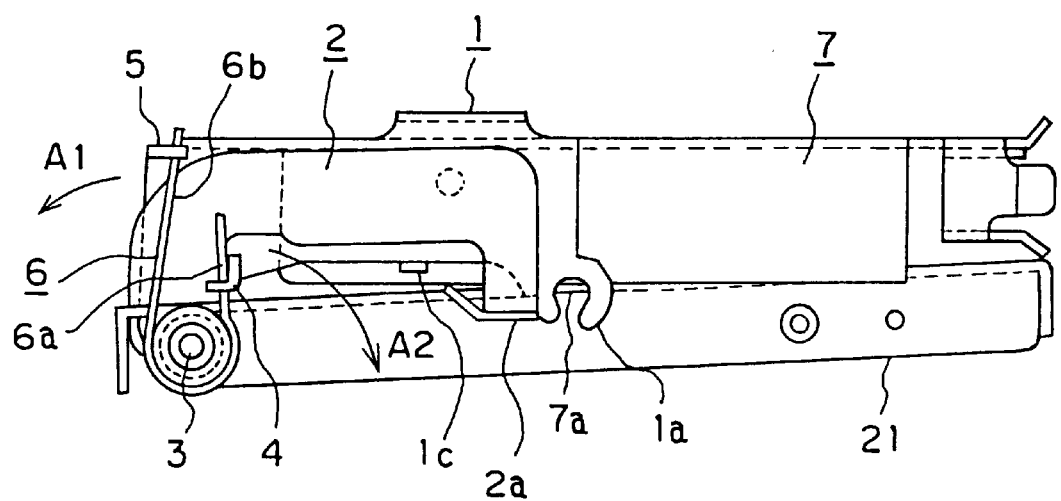
FIG. 34 is a side view showing the disc device of the first embodiment when the upper part of the holder is pushed downwards.

The holder 7 is in alignment as shown in FIG. 2b with the floating base 21 between the instant when a disc cartridge is inserted and the instant when the disc cartridge is carried to the replay position. If the upper portion 7b of the holder 7 in this alignment is pushed down, there is a possibility that a disc cartridge cannot be inserted into the holder 7. In order to prevent this malfunction, the disc cartridge inserting and discharging mechanism is so constructed that a force exerted on the upper portion is transmitted to the holder arm 1 combined with the holder 7 when the upper portion 7b is pushed down, and then the holder 7 rotates about the pins 3 and 23 disposed as the rotational axis of the holder 7 in a cartridge loading direction (the direction indicated by the arrow N in FIG. 2b). The downward movement of the holder causes the projecting portion 5 of the holder arm 1 to bend the spring 6, the arm portion 6a of which is engaged with the projecting portion 4 of the side arm 2, in the clockwise direction against the elastic force of the arm portion 6b. As a result, the disc cartridge inserting and discharging mechanism becomes a state as shown in FIG. 34. In other words, the side arm 2 and holder arm 1 are adapted to absorb a pushing force exerted on the upper portion 7a.

Figure 35:
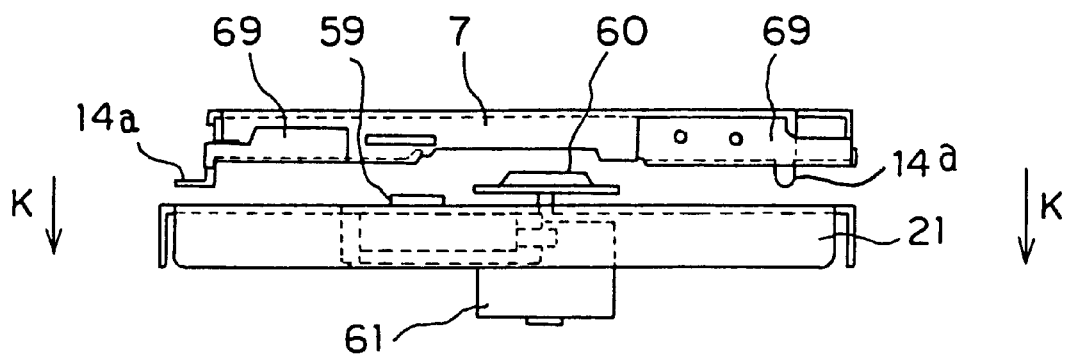
FIG. 35 is a rear view showing the slider provided with a pair of protrusions when viewed from the upper side of FIG. 5.

Next, a description will be made as to a mechanism for preventing the slider 14 from coming into contact with the turn table 60 and pickup 59 between the instant when a disc cartridge is inserted and the instant when the cartridge is carried to the replay position. FIG. 35 shows a side view showing the holder 7, slider 14, and floating base 21 when viewed from the upper side of FIG. 5. The slider 14 is provided with a pair of protrusions 14a projecting toward the floating base 21. When a force in the direction indicated by the arrow K in FIG. 35 is exerted on the holder 7, first the pair of projecting portions 14a are brought into contact with the upper surface of the floating base 21. Thus, the lower surface of the slider 14 is not brought into contact with the turn table 60, pickup 59, and so on. Accordingly, the occurrence of failures of the turn table 60 and pickup 59 due to a collision between them and the slider 14 can be prevented.

Figure 36:
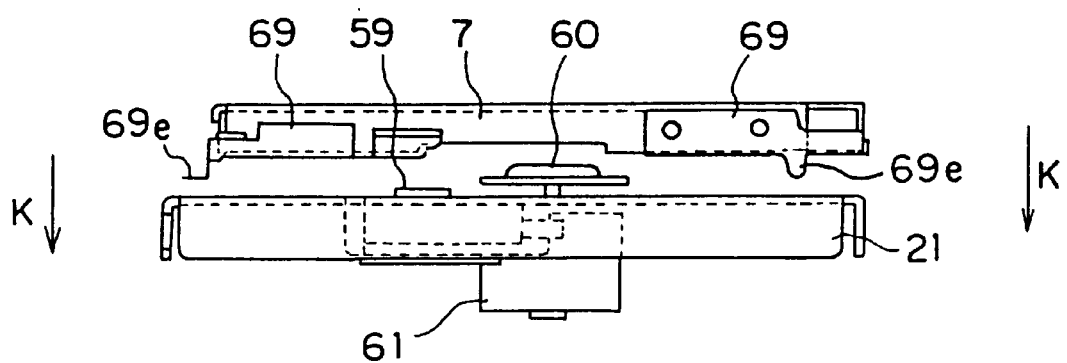
FIG. 36 is a rear view showing a pair of slider hooks provided with a pair of protrusions when viewed from the upper side of FIG. 5.

Alternatively, as shown in FIG. 36, the pair of slider hooks 69 can be provided with a pair of protrusions 69e, respectively. Like the above-mentioned case, the occurrence of failures of the turn table 60 and pickup 59 due to a collision between them and the slider 14 can be prevented.

As previously mentioned, when a disc cartridge is inserted into the holder 7, the pair of guide holes of the disc cartridge are respectively engaged with the pair of bent portions 69a of the pair of slider hooks 69 fixed on the slider 14, as shown in FIG. 5. After that, when the user further pushes the disc cartridge, the slider 14 is pushed forward by the disc cartridge and slides along the guide grooves 18 and 19 of the holder 7. As the slider 14 slides, the ejector arm 9 rotates about the axis 26 so that the pin 20 disposed at one end part of the ejector arm 9 moves within the groove 10 of the slider 14 in the direction indicated by the arrow E in FIG. 5. The rotation of the ejector arm 9 causes the end portion 31 of the ejector arm 9 as shown in FIG. 10 to dissociate itself from the switch 32. As a result, the contact between the end part 31 and the switch 32 is released and hence the switch 32 is switched on.

When the switch 32 is turned on, the power motor 56 is activated and then the rotary cam 55 rotates in the clockwise direction (the direction indicated by the arrow V in FIG. 5) by virtue of the rotational force of the power motor 56. Thus, the pin 78 rotates about the axis 77 and the ejector arm 9 rotates in the counterclockwise direction, so that the slider 14 further slides within the holder 7. As a result, the disc cartridge carried by the slider 14 moves toward the back of the holder 7. As the disc cartridge moves, the shutter opener 11 moves together with the cartridge. Then, as shown in FIG. 6, when the end part 8a of the hook 8 of the shutter opener 11 is brought into contact with a side wall 73a of the hole 73 of the holder 7, the sliding movement of the shutter opener 11 is stopped. After that, as the disc cartridge further moves toward the back of the holder, the hook 8 of the shutter opener 11 relatively slides along the guide groove of the disc cartridge inserted. As a result, the end part 8a of the hook 8 is engaged with the shutter of the disc cartridge and the shutter is opened.

Since the shutter opener 11 slides on the holder 7 in this manner, the travel of the disc cartridge with respect to the holder 7 can be increased by the travel of the shutter opener 11. That is, the disc cartridge can move through not only the sliding stroke of the shutter thereof but also the travel of the shutter opener 11, with respect to the hook 8 of the shutter opener 11. Therefore, the carrying start position of a disc cartridge inserted into the holder 7 (i.e. the position where the pair of guide holes of the disc cartridge inserted are engaged with the pair of slider hooks 69) can be moved closer to the insertion opening of the holder 7. Accordingly, the needed travel through which the user has to move a disc cartridge when inserting it into the holder can be reduced. In other words, the length of a part of a disc cartridge projecting out of the insertion opening when the disc cartridge is ejected from the holder can be increased. Thus, the user can easily insert a disc cartridge into the disc device and can easily take out a disc cartridge when it is ejected from the disc device.

Figure 37:
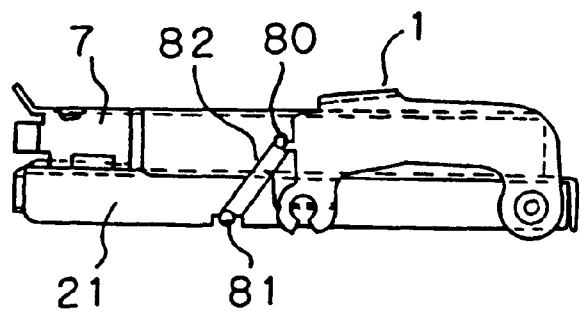
FIG. 37 is a side view showing a spring engaged between the floating base and the holder arm.

As shown in FIG. 6, when the pin 15 for slidably securing the slider 14 to the holder 7 comes into contact with an end part 18a (see FIG. 5) of the guide groove 18, the sliding movement of the slider 14 is stopped. After that, as the rotary cam 55 further rotates in the clockwise direction, the links 84 and 95 as shown in FIG. 16 rotates. As a result, as shown in FIGS. 28 through 30, the pair of slide plates 37 and 50 move in the directions indicated by the arrows G and I, respectively, and then the engagement of the inclined portion 37a with the inclined portion 2a of the side arm 2 is released. On the other hand, as shown in FIG. 37, the holder 7 is, together with the holder arm 1, pushed toward the floating base 21 by the urging force of a spring 82 connected between a projecting portion 80, which is formed by cutting and bending, of the holder arm 1 and a projecting portion 81, which is formed by cutting and bending, of the floating base 21. Thus, when the engagement of the inclined portion 37a with the inclined portion 2a of the side arm 2 is released, the spring 82 engaged between the holder arm 1 and the floating base 21 causes the holder arm 1 to rotate about the pins 3, 23 in the direction indicated by the arrow A2 in FIG. 2b, i.e., toward the floating base, and hence the projecting portion 7a of the holder 7 engaged with the circle-shaped notch 1d of the holder arm 1 is moved toward the floating base 21. As a result, the holder 7 descends toward the floating base 21. The spring 82 also serves to prevent the rattle of the holder 7 regardless of whether the floating base 21 is locked or not.

After the engagement of the inclined portion 37a of the slide plate 37 with the inclined portion 2a of the side arm 2 is released and then the holder 7 descends toward the floating base 21, the rotary cam 55 further rotates in the clockwise direction together with the pin 78. Thus, the pin 78 moves within the groove 79 formed by the ejector arm 9 and spacer arm 25 while rotating. As a result, as shown in FIG. 7, the ejector arm 9 and slider 14 are separated from each other. During the above movement, the pair of slide plates 37 and 50 further slide on the chassis 24 so that the floating base 21 is unlocked. Thus, the floating base 21 becomes a vibration-proof state in which it is supported by the elastic members and loading the disc cartridge on the floating base is finished. At the completion of loading the disc cartridge, since the ejector arm 9 is sufficiently away from the floating base 21, the ejector arm 9 never comes into collision with the floating base 21 or slider 14 even if the floating base 21 undergoes displacement with respect to the chassis 24 due to vibrations or the like caused by a vehicle equipped with the disc device according to the present invention.

As shown in FIG. 30, when the slide plate 50 slides and then a projecting plate 50a of the slide plate pushes a stop switch 102, the stop switch 102 is switched on and then the power motor 56 is stopped. The loading operation is thus completed.

Next, a description will be made as to disc cartridge discharging operation. The disc cartridge discharging operation is started by the push of an eject button by the user. When the eject button is pushed, the power motor 56 begins to rotate opposite to the direction of inserting a disc cartridge into the holder and hence the rotary cam 55 begins to rotate in the counterclockwise direction. The following disc cartridge discharging operation can be carried out by reversing the above-mentioned disc cartridge inserting operation.

Figure 38:
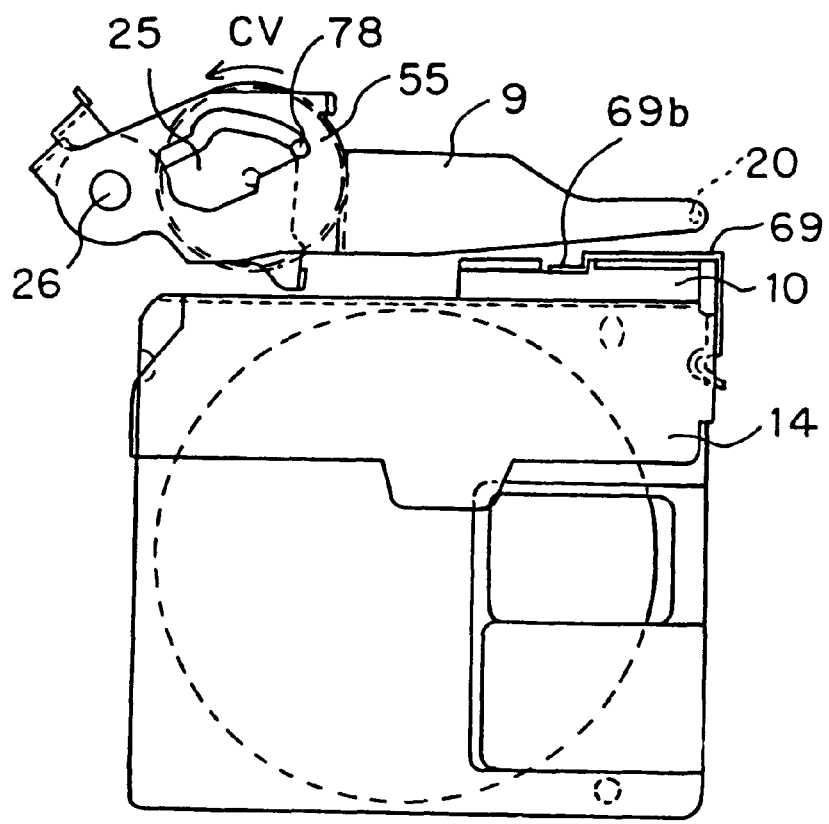
FIG. 38 is a plan view showing the ejector arm, groove portion of the slider, and a bent portion of one of the pair of slider hooks.
Figure 39:
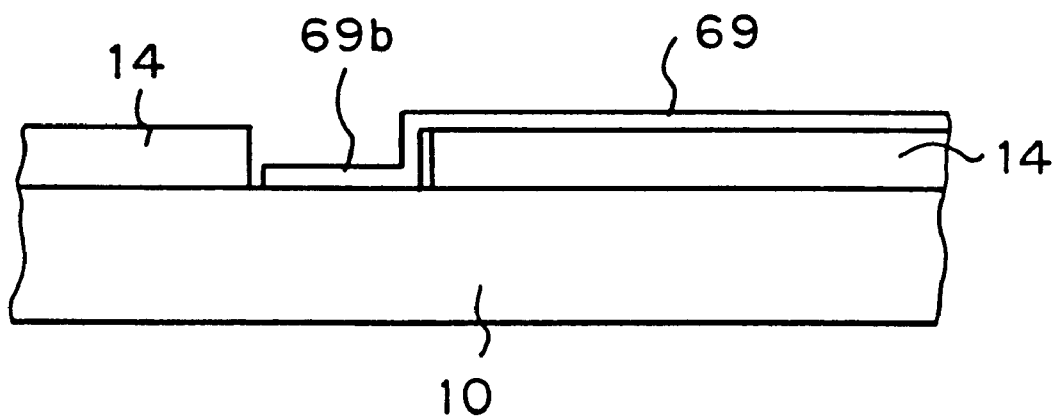
FIG. 39 is an enlarged view showing the bent portion shown in FIG. 38.
Figure 40:
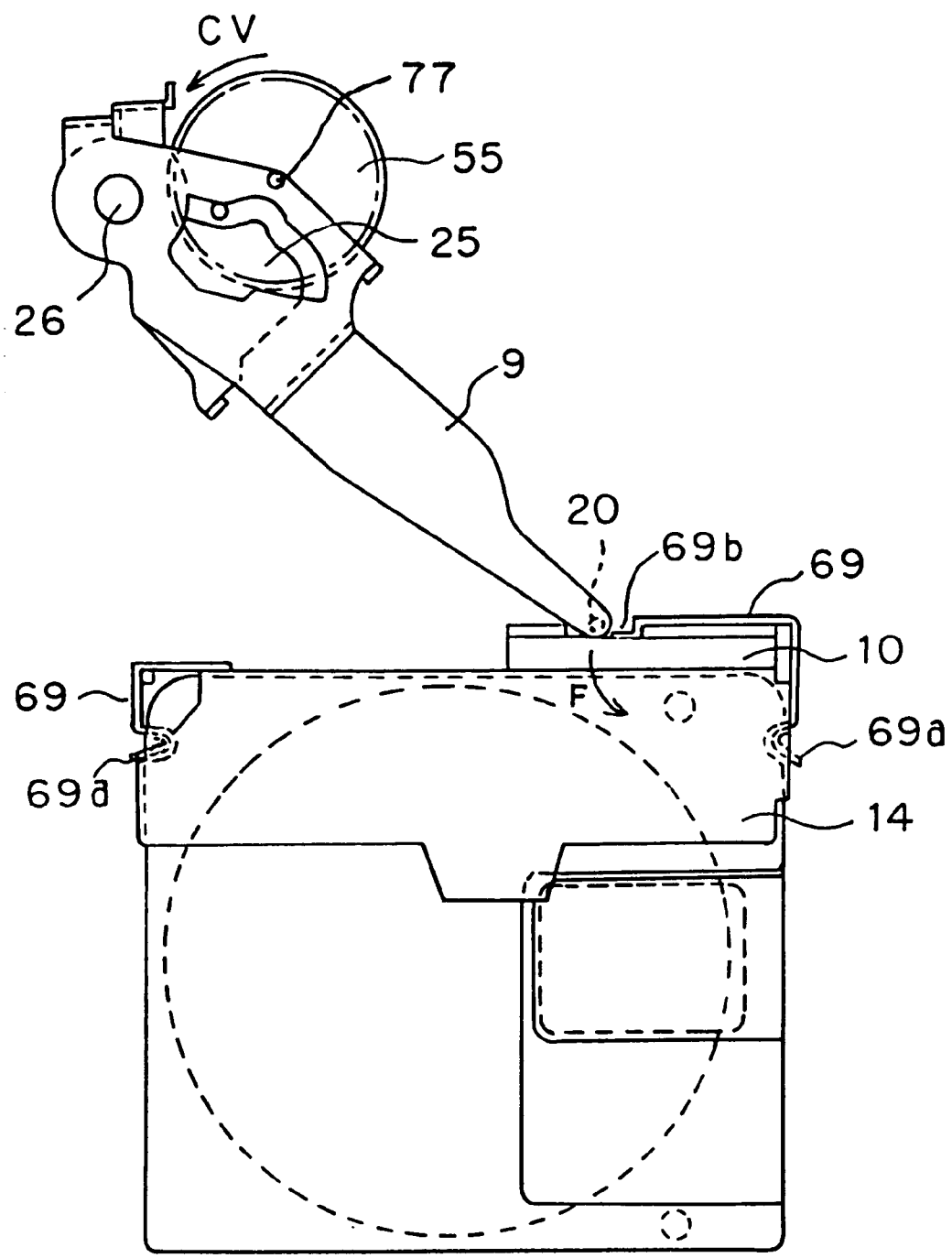
FIG. 40 is a plan view showing a state wherein the pin of the ejector arm is brought into contact with the bent portion of the slider hook.

Referring now to FIGS. 38 and 39, they illustrate a plan view of a variant of the slider and an enlarged view of the slider, respectively. As shown in these figures, one of the pair of the slider hooks 69 each constructed of an elastic body such as a flat spring is provided with a bent portion 69b recessed on the slider hook, which constructs a part of the wall surrounding the groove portion 10 of the slider 14, as shown in FIG. 39. The bent portion 69b realizes a safety mechanism as described hereinafter. After the eject button is pushed and then the rotary cam 55 starts rotating in the counterclockwise direction indicated by the arrow CV in FIG. 38, the pin 20 is caught by the groove portion 10 and an ejecting function is performed as shown in FIG. 6 in a normal condition. If a position of the slider 14 has slipped to an ejecting direction when the ejecting function starts, it is impossible for the pin 20 to be caught by the groove portion 10 since the pin 20 positions outside the groove portion 10 as shown in FIG. 40. Here, it is impossible for the slider 14 to move to an inverse ejecting direction since an end portion of the guide groove 18 and the pin 15 are in contact with each other.

If the ejecting function starts under the condition, the ejecting function is completed since the pin 20 can push the groove portion 10 and slide outside the groove portion 10. However, if a loading function is intended to start again, the loading function is not completed since the pin is not caught by the groove portion 10. Thus, an error function occurs. In order to recover a normal condition, the bent portion 69b is provided with.

Figure 41:
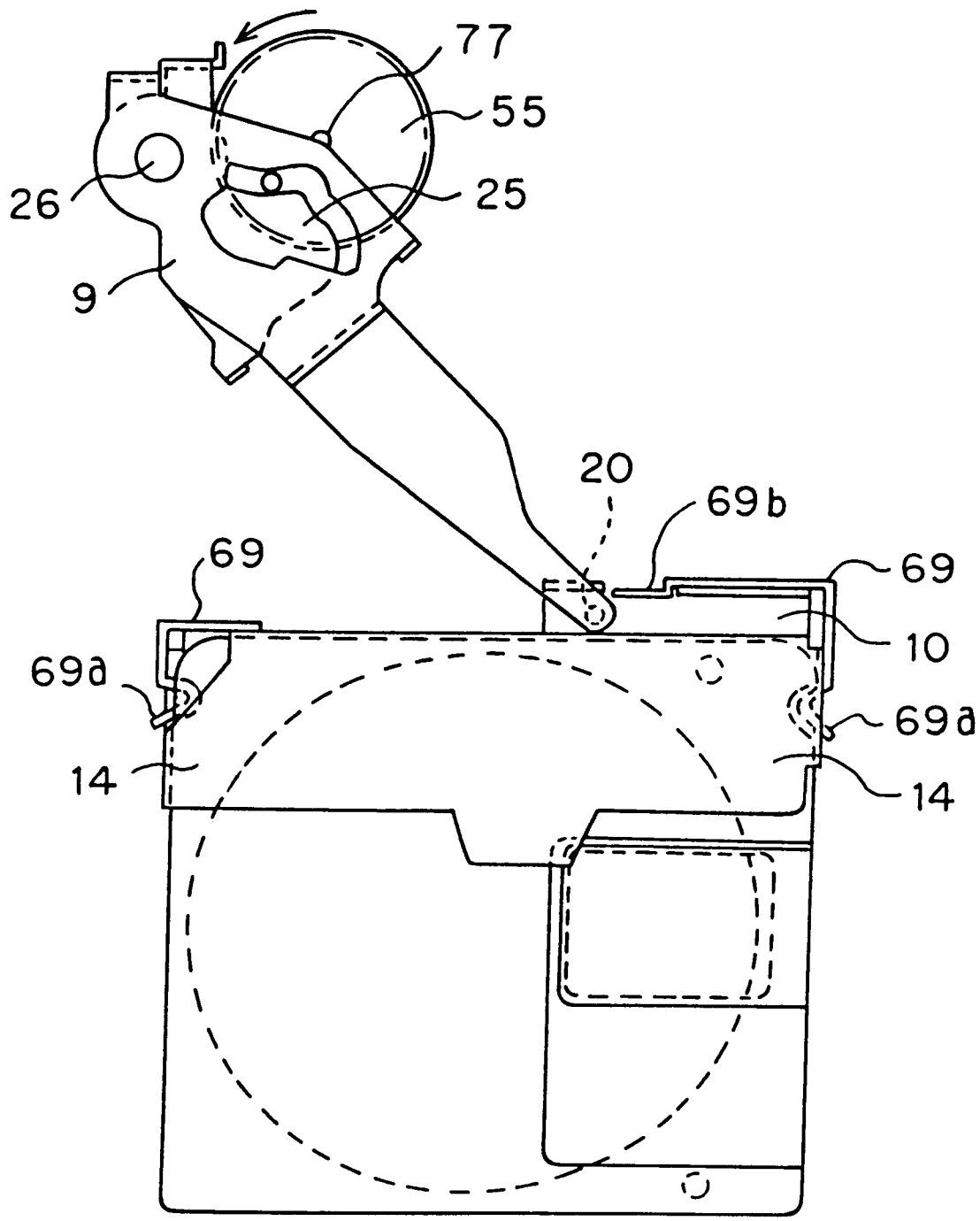
FIG. 41 is a plan view showing a state wherein the pin of the ejector arm is engaged in the groove portion of the slider.

When the rotary cam 55 rotates in CV direction, the pin 20 of the ejector arm 9 comes into contact with the above-mentioned slider hook 69 and then slides on the slider hook 69 toward the recessed portion 69b. In this case, the pin 20 of the ejector arm 9 cannot move without being engaged in the groove portion 10 of the slider 14. As shown in FIG. 40, when the rotary cam 55 further rotates, the pin 20 comes into contact with the bent portion 69b of the slider hook 69 which is disposed so as to cover an opening of the groove portion 10. Then, the bent portion 69b is pushed and is then bent in the direction indicated by the arrow F. As a result, the opening is opened and then the pin 20 enters into the groove portion 10 through the opening. The pin 20 is thus engaged in the groove 10 of the slider 14, as shown in FIG. 41.

Figure 43:
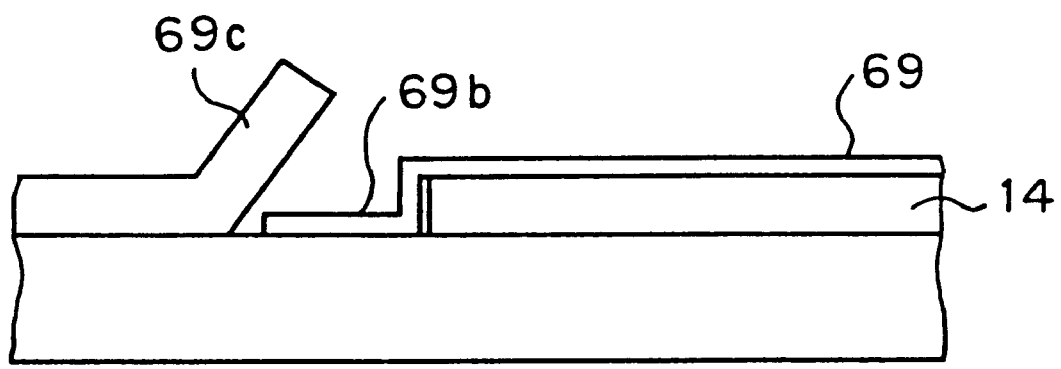
FIG. 43 is an enlarged view showing the guide portion shown in FIG. 42.
Figure 42:
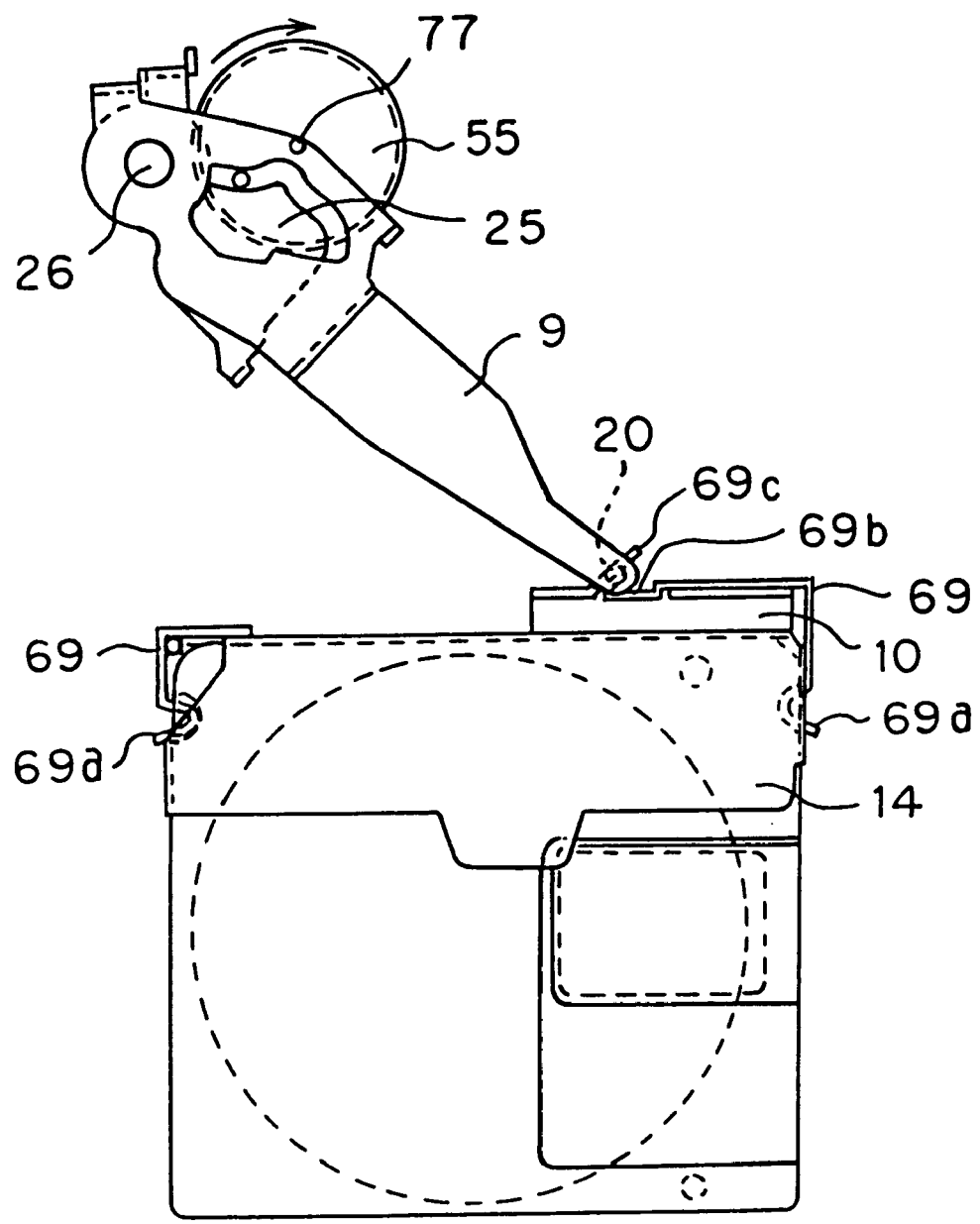
FIG. 42 is a plan view showing a state wherein the pin of the ejector arm is guided by a guide portion and then is brought into contact with the bent portion of the slider hook.

Referring now to FIGS. 42 and 43, they illustrate a plan view of another variant of the slider and an enlarged view of the slider, respectively. As shown in these figures, one of the pair of slider hooks 69 is further provided with a guide portion 69c in addition to the bent portion 69b. Accordingly, when a disc cartridge is discharged out of the holder, the pin 20 can easily come into contact with the bent portion 69b and then can be engaged in the groove 10 easily because the pin 20 is guided by the guide portion 69c.

Next, a description will be made as to locking and unlocking operation of the floating base 21. In a state wherein the floating base 21 is locked, as shown in FIGS. 16 through 19, when the rotary cam 55 rotates in the clockwise direction, the pin 85 of the link 84 moves along the groove 86 of the rotary cam 55. As a result, the link 84 rotates about the axis 87 disposed as a supporting axis and hence the slide plate 37 engaged with the end part 88 moves in the direction indicated by the arrow G in FIG. 16. The movement of the slide plate causes the protrusion 90 to move along the cam groove 89 formed in the slide plate 37, with result that the locking arm 35 rotates in the direction indicated by the arrow H in FIG. 18. The movements of the slide plate 37 and locking arm 35 cause the locking grooves 91 and 92 of the slide plate 37 to dissociate themselves from the pins 3 and 94 of the floating base 21. Finally, the pins 3 and 94 are unlocked.

As the pin 96 of the link 95 moves along the groove 97 of the rotary-cam 55 in synchronization with the link 84, the link 95 rotates about the axis 150 disposed as a supporting axis. As a result, the slide plate 50 engaged with the end part 151 of the link 95 moves in the direction indicated by the arrow I in FIG. 19 and the locking arm 49 rotates in the direction indicated by the arrow J in FIG. 19. The movements of the slide plate 50 and locking arm 49 cause the locking grooves 100 and 101 of the slide plate 50 to dissociate themselves from the pins 98 and 99 of the floating base 21. Finally, the pins 98 and 99 are unlocked.

As previously mentioned, since the springs 45 and 48 urge the slide plates in opposite directions, i.e., in the directions of locking and unlocking the floating base, respectively, the driving force required for unlocking the floating base can be the same as that required for locking the floating base. The operation of locking the floating base can be accomplished by reversing the above-mentioned unlocking operation.

Referring now to FIGS. 44 and 45, they illustrate a rear view partially showing the slider of a disc device according to a second embodiment of the present invention, and a plan view partially showing the slider, respectively.

In the second embodiment, the mechanism for facilitating the engagement of the pin 20 of the ejector arm 9 with the groove portion 10 of the slider 14 in order to prevent the pin 20 of the ejector arm 9 from moving without being engaged in the groove portion 10 of the slider 14 differs from that according to the first embodiment. In FIGS. 44 and 45, the same parts as those of the first embodiment are designated by the same reference numerals. Furthermore, the description about the same parts will be omitted.

A spring 201 is engaged between a projecting portion 69d, which is formed by cutting and bending, of the slider hook 69 and a projecting portion 202a, which is formed by cutting and bending, of a slide plate 202. The slide plate 202 is slidably disposed within the groove portion 10 of the slider 14 and is urged toward the slider hook 69 by the spring 201. After the eject button is pushed and the rotary cam 55 starts rotating in the counterclockwise direction indicated by the arrow CV in FIG. 38, the pin 20 of the ejector arm 9 comes into contact with the above-mentioned slider hook 69 and then moves toward a guide portion 202b projecting from the slide plate 202. When the rotary cam 55 further rotates, the pin 20 comes into contact with the guide portion 202b of the slide plate 202 and then the slide plate 202 slides so as to generate an opening 200, as shown in FIG. 45. The pin 20 enters into the groove portion 10 through the opening 200 and is then engaged in the groove portion 10. The pin 20 of the ejector arm 9 is thus prevented from moving without being engaged in the groove portion 10 of the slider 14. After the pin 20 is engaged in the groove portion 10, the slide plate 202 returns to its original position by the spring 201 and hence the opening 200 is closed.

Figure 46:
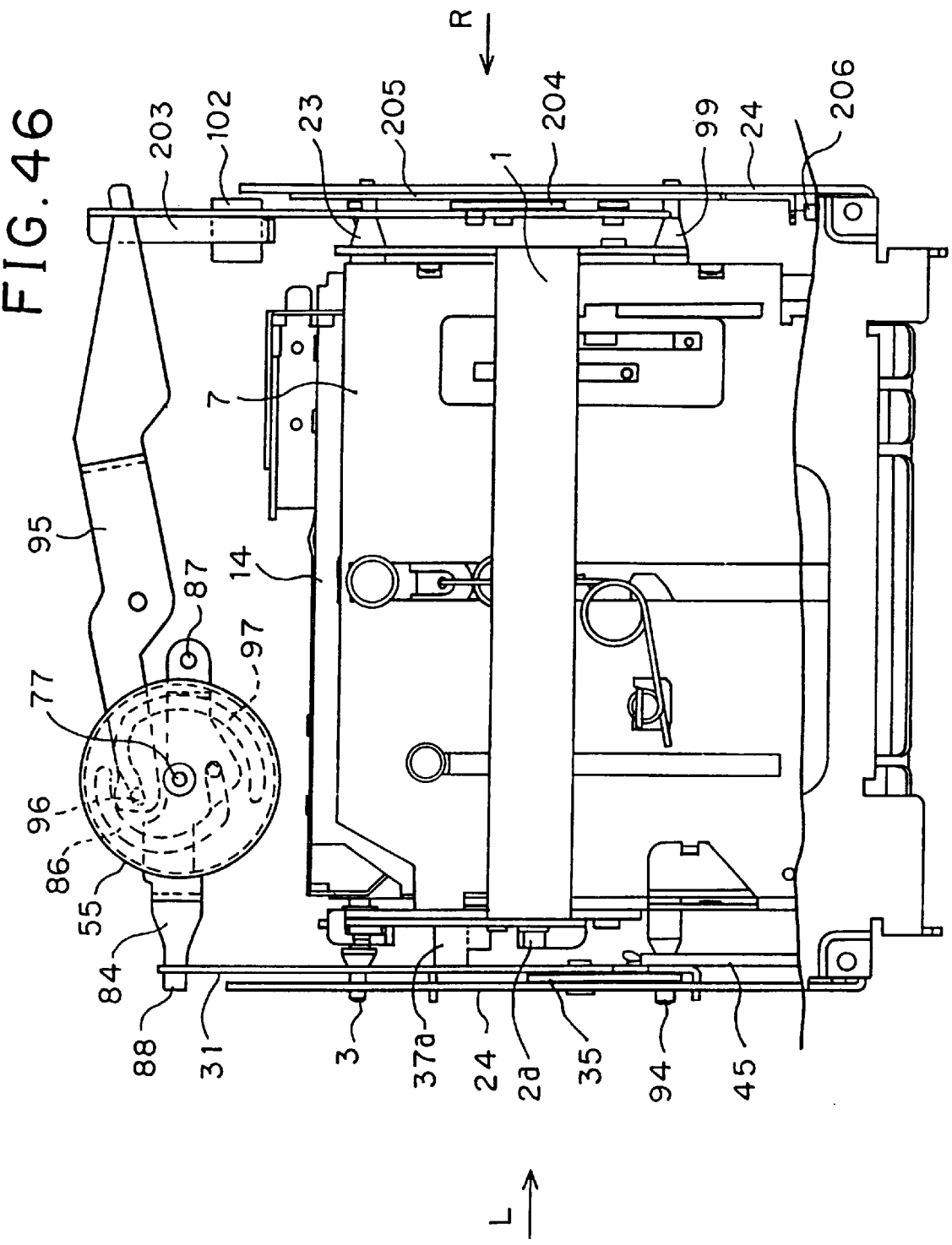
FIG. 46 is a general plan view of a disc device according to a third embodiment of the present invention.
Figure 47:
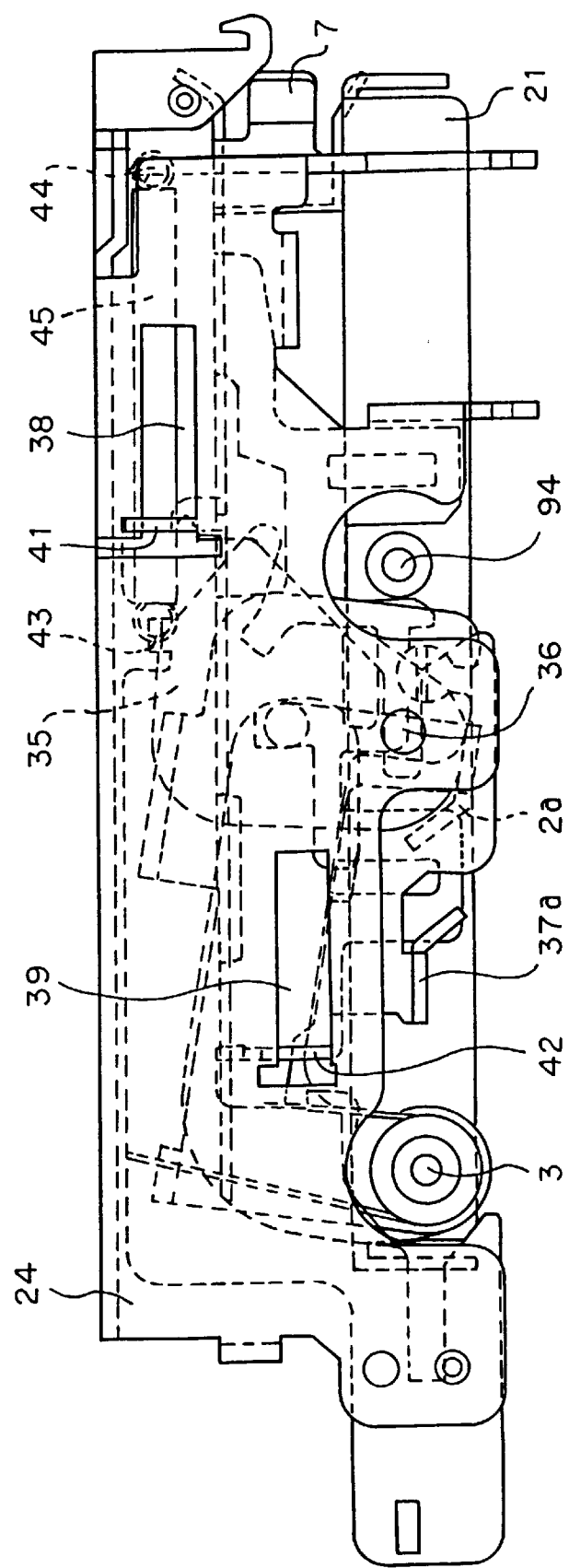
FIG. 47 is a left side view of the disc device when viewed from the direction indicated by the arrow L in FIG. 46.
Figure 48:
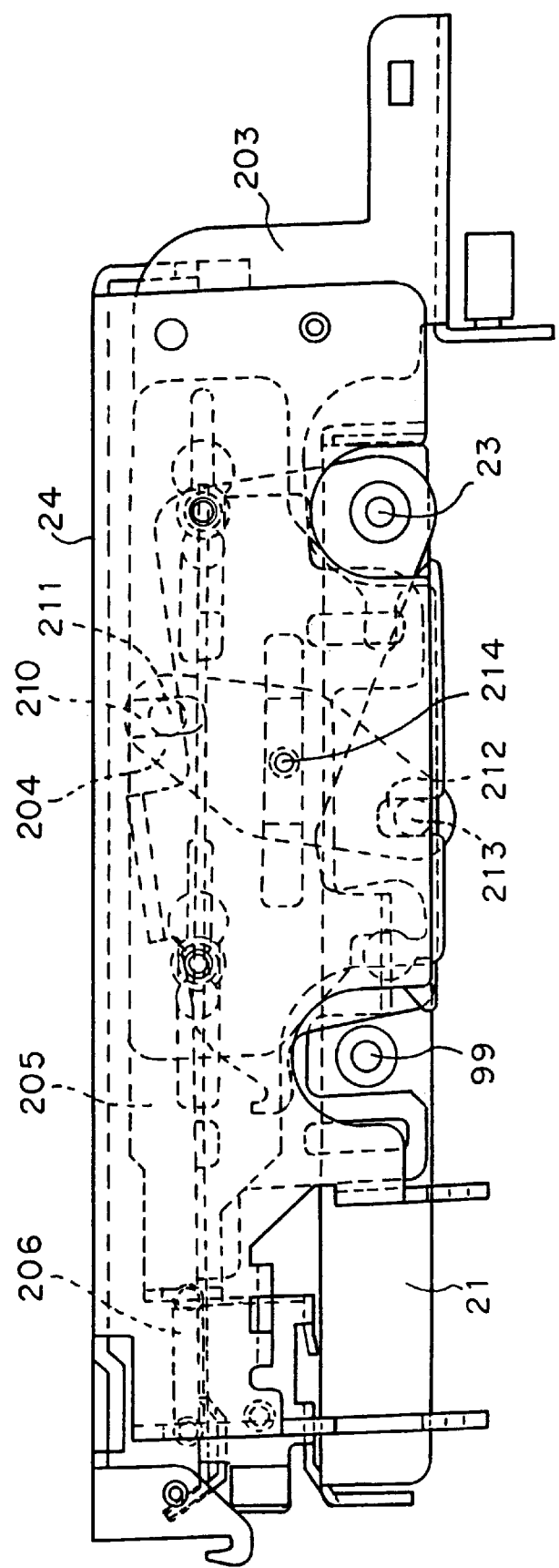
FIG. 48 is a right side view of the disc device when viewed from the direction indicated by the arrow R in FIG. 46.
Figure 50:
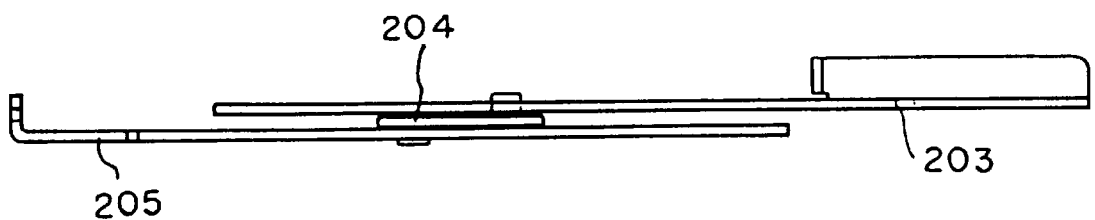
FIG. 50 is a plan view showing first and second slide plates and a link plate which are integral parts of the floating base locking mechanism according to the third embodiment as shown in FIG. 49.
Figure 51:
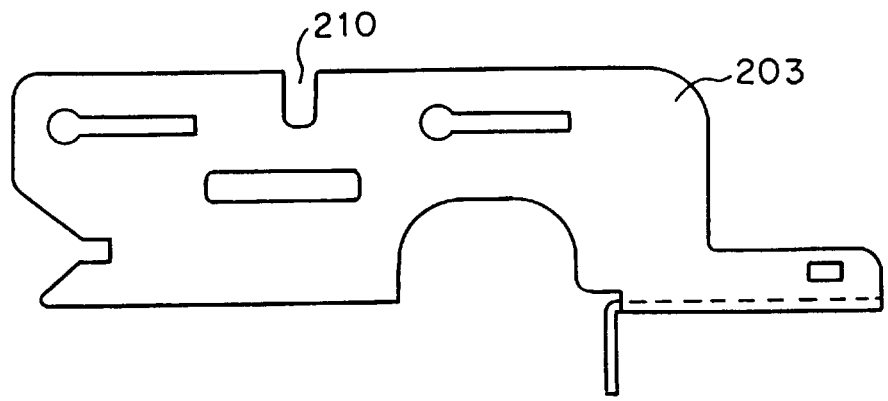
FIG. 51 shows an elevational view of the first slide plate shown in FIG. 50.
Figure 52:
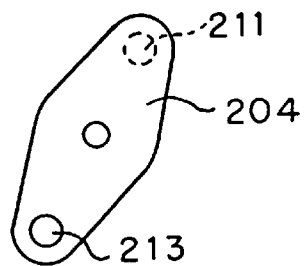
FIG. 52 shows an elevational view of the link plate shown in FIG. 50.
Figure 53:
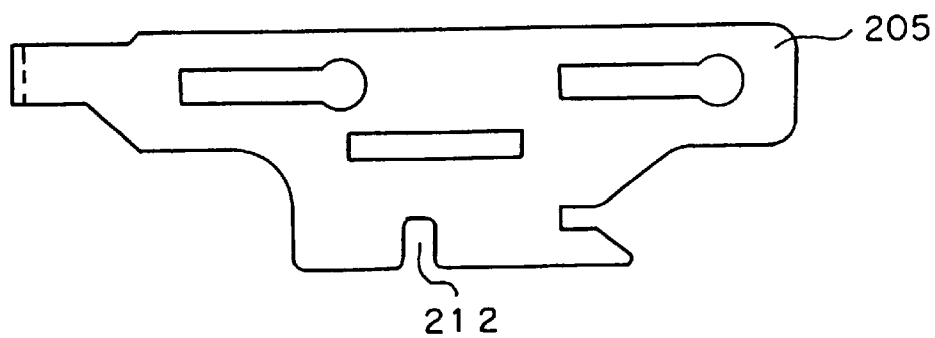
FIG. 53 is an elevational view of the second slide plate shown in FIG. 50.

Referring now to FIGS. 46, 47, 48, and 49, they illustrate a general plan view of a disc device according to a third embodiment of the present invention, a left side view of the disc device when viewed from the direction indicated by the arrow L in FIG. 46, a right side view of the disc device when viewed from the direction indicated by the arrow R in FIG. 46, and a partially cutaway view of FIG. 48. Furthermore, FIG. 50 shows a plan view showing slide plates 203 and 205 and a link plate 204 which are integral parts of the floating base locking mechanism according to this embodiment, FIG. 51 shows an elevational view of the slide plate 203, FIG. 52 shows an elevational view of the link plate 204, and FIG. 53 shows an elevational view of the slide plate 205. In the third embodiment, the floating base locking mechanism partially differs from that according to the first embodiment. In FIGS. 46 through 53, the same parts as those of the first embodiment are designated by the same reference numerals. Furthermore, the description about the same parts will be omitted.

In accordance with this embodiment, the driving link 95 is connected with the slide plate 203 which can lock the locking pin 99, instead of the slide plate 50 according to the first embodiment mentioned above, as shown in FIG. 46. As shown in FIG. 51, the slide plate 203 is provided with a groove 210 which is engaged with a pin 211 of the link plate 204. As shown in FIG. 53, the slide plate 205 is provided with a groove 212 which is engaged with a pin 213 of the link plate 204. The slide plates 203 and 205 are slidably attached on the chassis 24 and the link plate 204 is disposed so as to rotate about an axis 214 fixed on the chassis 24. When the slide plate 203 slides as the link 95 rotates, the slide plate 205 which can lock the other locking pin 23 slides opposite in direction to the travel of the slide plate 203 through the link plate 204.

Figure 49:
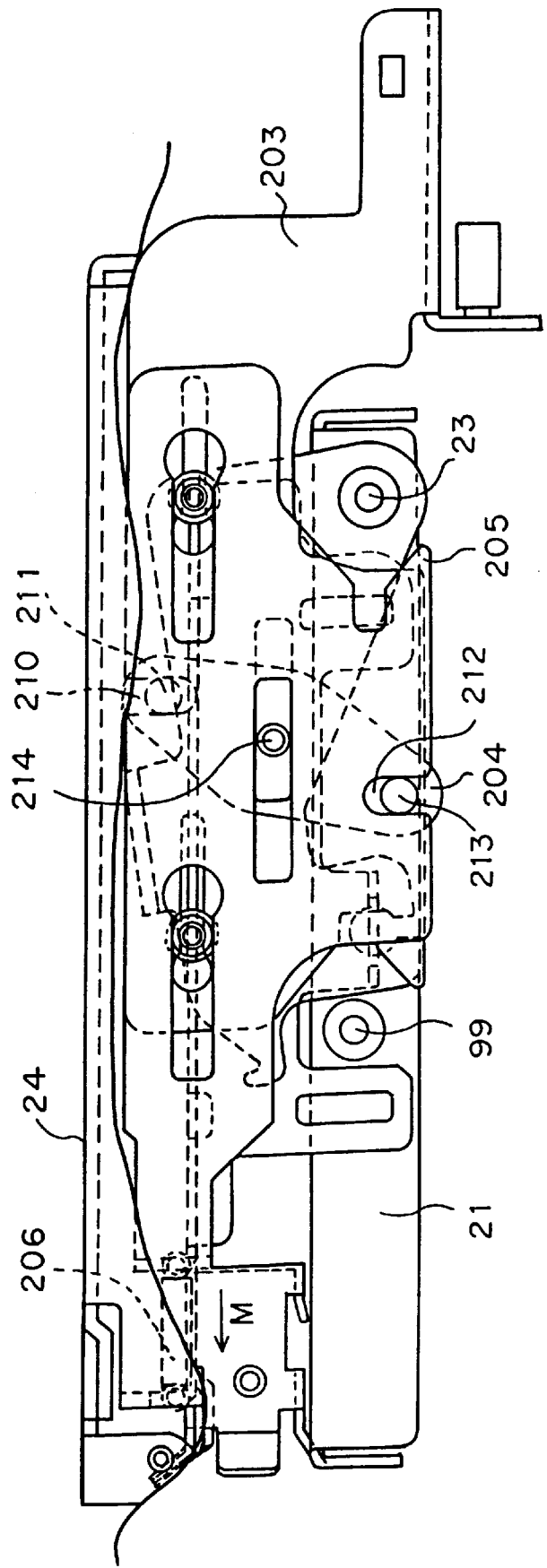
FIG. 49 is a partially cutaway view of FIG. 48.

Furthermore, as shown in FIG. 49, a spring 206, one end of which is connected with the chassis 24 and the other end of which is connected with the slide plate 205, urges the slide plate 205 which is at the longest distance from the driving link 95 in the direction indicated by the arrow M in the figure. Thus, the rattle and chatter of the driving link 95, slide plate 203, link plate 204, and slide plate 205 can be prevented.

As previously mentioned, the present invention offers the following advantages.

In accordance with the above-mentioned embodiments, a rotary cam is rotatably disposed on a chassis for driving members for locking a floating base and for driving a driving arm engaged with a slider in order to insert a disc cartridge into a holder or discharge the disc cartridge out of the holder, and the driving arm is adapted to dissociate itself from the slider when the disc cartridge held in the holder moves up and down and when writing to or replaying the disc cartridge. Thus, when writing to or replaying the disc cartridge, the floating base can be in a vibration-proof state wherein it is supported by only a plurality of elastic members. Furthermore, since the driving arm does not come into contact with the floating base during replaying or writing to the disc cartridge, vibrations are not created in the floating base.

Since the width of a driving gap between the driving arm and a space arm in the vicinity of the end-of-travel point of a-pin disposed on end part of the rotary cam is narrower than the size of the pin and the pin is securely held by the arms due to the urging force of a spring connected between the arms, the rattle and chatter of the arms can be prevented.

Furthermore, the rotary cam is provided with grooves engaged with the pins of a pair of links which drive a pair of slide plates for locking the floating base. This results in preventing the pair of slide plates from moving out of synchronization with each other. Accordingly, the locking and unlocking operations of the floating base can be carried out smoothly.

In addition, there are provided a spring which urges one of the pair of slide plates and another spring which urges the other of the pair of slide plates in the opposite direction. Therefore, variations in the driving force required for causing the slide plates to slide can be reduced regardless of whether the pair of slide plates slide in the locking direction or in the unlocking direction. As a result, the pair of slide plates can slide smoothly, and the needed driving force can be decreased.

Furthermore, in accordance with one embodiment of the present invention, one of the pair of slide plates is constructed by two plates which can slide in opposite directions in synchronization with each other by means of a link plate, and two pins disposed on one side surface of the floating base are locked by the two plates which have slid in opposite directions. Thus, the lock of the floating base can be ensured.

In addition, there are provided a lug for preventing wrong insertion of a cartridge, a switch lever which is pivotably attached on the holder and is located behind and outside the end part of the lug, when viewed from an insertion opening through which a disc cartridge is inserted, so that a projecting portion thereof is brought into contact with a corner of the disc cartridge inserted correctly, and a switch which is able to detect correct insertion of a disc cartridge when the switch arm rotates. Therefore, since, when the switch detects wrong insertion of a disc cartridge, the disc cartridge is not carried, failures due to wrong insertion can be prevented.

Furthermore, there is provided a shutter opener having a protrusion which can open the shutter of a disc cartridge, the shutter opener being supported on the holder so that the shutter opener can slide in the directions of inserting and discharging a disc cartridge into and out of the holder. Therefore, the travel of the disc cartridge with respect to the holder can be increased by the travel of the shutter opener. The length of a part of the disc cartridge projecting out of the holder when the cartridge is ejected from the holder can be increased. Thus, the user can easily take out the disc cartridge when it is ejected from the disc device.

In addition, a holder arm is rotatably attached on the floating base and the holder is mounted on the holder arm in such a manner that the holder can rotate with respect to the holder arm. Therefore, the holder can smoothly move downwards and upwards to and from the floating base.

Furthermore, the holder arm is provided with a pair of circle-shaped notches, the opening of each of which is not directed toward the cartridge insertion opening of the holder, and the holder is provided with a pair of projecting portions each projecting therefrom in a nearly horizontal direction. The cross section of each of the pair of projecting portions is shaped such that the thickness of the longitudinal side is larger than that of the opening of the circle-shaped notch and the thickness of the other side is smaller than that of the opening of the circle-shaped notch. Therefore, the assembly of the holder and holder arm can be easily carried out by inserting the pair of projecting portions into the pair of circle-shaped notches in such a manner that the thinner side of each of the projecting portions is fitted into the opening of each of the circle-shaped notches, and then rotating the holder so that the thicker side of each of the projecting portions is engaged in each of the notch portions. Thus, the pair of projecting portions of the holder do not fall off the pair of notch portions of the holder arm.

In addition, when the floating base is locked, a side arm is brought into contact with the slide plate and is therefore secured. Furthermore, the holder arm is rotatably engaged with the side arm by a spring. Therefore, when a disc cartridge is inserted into the holder in a slanting direction which deviates upwards or downwards from a horizontal direction, the holder is tilted upwards or downwards. This results in preventing the holder from distorting.

Furthermore, there is provided a pair of protrusions disposed on either the slider or the pair of slider hooks, the protrusions projecting toward the floating base. Therefore, only the protrusions projecting the slider abuts on the floating base even if the holder moves downward when a disc cartridge is inserted in a slanting direction toward the floating base. This results in preventing the slider from coming into contact with the turn table and optical pickup.

In addition, there is provided an opening formed in a side wall surrounding the groove portion of the slider engaged with the driving arm, and an elastic member which covers the opening. When the driving arm moves in the direction of discharging a disc cartridge inserted, a pin disposed at one end part of the driving arm comes into contact with the elastic member and hence the elastic member is pushed and bent. Then, the opening is opened and the pin of the driving arm enters into the groove portion. After that, the opening is closed and the driving arm is securely engaged in the groove portion. Thus, since the pin of the driving arm is securely accommodated within the groove portion, there is not a case where the driving arm is not engaged with the groove portion of the slider and hence the slider cannot move when inserting a disc cartridge.

Furthermore, there is provided a guide protrusion in the vicinity of the opening of the groove portion of the slider. When discharging a disc cartridge inserted, the pin of the driving arm is guided by the guide protrusion and hence is easily brought into contact with the elastic member. Thus, the pin of the driving arm can be securely engaged in the groove portion.

In addition, there can be provided a slide plate at the opening of the groove portion of the slider instead of the elastic member, and a spring which urges the slide plate so that the slide plate covers the opening. When discharging a disc cartridge inserted, the pin of the driving arm is brought into contact with a projecting portion of the slide plate and this results in sliding the slide plate to open the opening. Thus, the pin of the driving arm can be securely engaged in the groove portion.

As mentioned above, in accordance with the aforementioned embodiments, various issues in bringing the disc device to the commercial stage, such as simplification of mechanical components, reduction in component count, improvement of assembly efficiency of mechanical components, and downsizing the disc device can be improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. A disc device comprising:

a floating base supported by a chassis through a plurality of elastic members;

a holder supported on said floating base so as to be able to move vertically with respect to said floating base;

a slider for holding and carrying a disc cartridge into and out of said holder, said slider slidably disposed in said holder so as to move in directions of inserting and discharging the disc cartridge into and out of said holder;

locking means which secures said floating base to said chassis when inserting the disc cartridge held in said slider into said holder and when discharging the disc cartridge out of said holder, and which releases said floating base from said chassis when writing to and replaying the disc cartridge inserted into said holder; and driving arm means, rotatably disposed in the chassis and including a first arm having an end part selectively engaged with a groove in said slider, wherein rotation of said first arm in a first direction causes said end part to slide within said groove so as to carry said slider together with the disc cartridge in the inserting direction when inserting the disc cartridge into said holder, rotation of said first arm in a second direction causes said end part to slide within said groove so as to carry said slider together with the disc cartridge in the discharging direction when discharging the disc cartridge out of said holder, and further rotation of said first arm in said first direction when the disc cartridge is within said holder causes said end part to disengage from said groove so that said first arm is disconnected from said slider when writing to and replaying the disc cartridge inserted into said holder.

2. The disc device according to claim 1, wherein said driving arm means includes an engaging portion, and wherein said disc device further comprises a rotary member having a projection portion which can move along said engaging portion of said driving arm means so as to cause said driving arm means to rotate as said rotary member rotates, and a holding means for securely holding said projecting portion of said rotary member which is engaged in said engaging portion of said driving arm means at least while said driving arm means is separate from said slider and said projecting portion is located in one end of said engaging portion.

3. The disc device according to claim 2, wherein said driving arm means further includes a second arm having an edge portion spaced apart from an edge portion of said first arm such that a driving gap is formed between the spaced apart edge portions, said engaging portion being the driving gap.

4. The disc device according to claim 3, wherein said holding means is a spring, engaged between said first and second arms, for urging them towards each other so as to narrow said gap in which said projecting portion of said rotary member is-engaged, and wherein said gap is formed so that said projecting portion of said rotary member is securely held in said gap by said spring at least while said first arm is separate from said slider and said projecting portion is located in one end of said gap.

5. The disc device according to claim 1, wherein said first arm includes a pin disposed at said end part thereof, said pin sliding within said slider groove as said driving arm means rotates.

6. The disc device according to claim 1, wherein said disc device further comprises a switch means for activating and deactivating said driving means in accordance with whether or not said driving arm means is in contact with said switch means.

7. A disc device comprising:

a slider, slidably disposed so as to move in directions of inserting and discharging a disc cartridge into and out of said disc device, for holding and carrying a disc cartridge insert thereinto;

a first arm, one end part of which is rotatably supported on an axis, and another end part of which can be engaged with said slider for inserting and discharging the disc cartridge;

a second arm, one end part of which is rotatably supported on the axis, and which forms a gap in cooperation with said first arm;

a rotary member having a projecting portion which is loosely engaged in said gap; and a spring, engaged and interconnected with said first and second arms, for urging said first and second arms towards each other so as to narrow said gap, said gap being formed so that said projecting portion of said rotary member is securely held in said gap by said spring as said first arm disconnects from said slider and said projecting portion is located in one end of said gap.

8. A disc device comprising:

a floating base supported by a chassis through a plurality of elastic members;

at least two slide platens slidably fixed on said chassis, movable between a locking position for securing said floating base to said chassis and an unlocking position for releasing said floating base from said chassis;

a rotary cam including at least two cam grooves on a face surface thereof; and at least two arms rotatable about a first axis of rotation, each of said arms having an end portion connected to a corresponding slide plate a including a projection portion on a face surface thereof, said projection portion engaging said rotary cam such that travel of the projection portions along corresponding cam grooves interacts with said arms to move said slide plates between the locked and unlocked positions.

9. The disc device according to claim 8, wherein said disc device further comprises an urging means for urging said pair of slide plates in opposite directions.

10. The disc device according to claim 8, wherein each of said pair of slide plates is provided with two locking grooves respectively engaged with two pins attached on said floating base when said floating base is locked.

11. The disc device according to claim 8, wherein one of said pair of slide plates is provided with two slide plate members which can slide in opposite directions through a link plate engaged with said slide plate members.

12. The disc device according to claim 8, wherein said holder comprises an inclined portion, and wherein said holder moves vertically and dissociates itself from said floating base when said inclined portion of said holder is engaged with one of said pair of slide plates, and wherein said holder-moves vertically toward said floating base and a disc cartridge in said holder is loaded onto said floating base when the engagement of said inclined portion of said holder with said one slide plate is released.

13. The disc device according to claim 8, wherein said device further comprises a switch means for activating and deactivating said driving means in accordance with whether or not one of said pair of slide plates is in contact with said switch means.

14. A disc device according to claim 8, wherein said at least one slide plate includes first and second slide plates;

said at least one arm includes first and second arms; and said at least one cam groove includes first and second cam grooves.

15. A disc device comprising:

a holder supported on a floating base so as to be able to move vertically with respect to said floating base;

a slider for holding and carrying a disc cartridge into and out of said holder, said slider movable between a disc cartridge insertion position and a disc playback position; and driving arm means for moving said slider between the disc cartridge insertion position and the disc playback position, said driving arm means including a first arm having an end part selectively engaged with a groove in said slider, wherein rotation of said first arm in a first direction causes said end part to slide within said groove so as to carry said slider together with the disc cartridge from the disc insertion position into the disc playback position, and further rotation of said first arm in said first direction when the disc cartridge is in the disc playback position causes said end part to disengage from said groove so that said first arm is disconnected from said slider when writing to and replaying the disc cartridge inserted into said holder.

16. A disc device comprising:

a slider movable between a disc cartridge insertion position and a disc playback position; and a driving mechanism including, a rotary cam rotatable about a first axis of rotation and including a projection portion on a face surface thereof, an ejector arm engaging said slider and said projection portion such that rotation of said rotary cam moves said projection portion along an edge portion of said ejector arm to move said slider from the disc cartridge insertion position to the disc playback position, and a spacer arm; wherein said spacer arm and said ejector arm are rotatable about a second axis of rotation;

the edge portion of said ejector arm is spaced apart from an edge portion of said spacer arm such that a driving gap is formed between the spaced apart edge portions; and said projection portion travels along the driving gap as said rotary cam rotates.

17. A disc device comprising:

a slider movable between a disc cartridge insertion position and a disc playback position; and a driving mechanism including, an ejector arm engaging said slider;

a spacer arm resiliently coupled to said ejector arm, said spacer arm having an edge portion spaced apart from an edge portion of said ejector arm such that a driving gap is formed between the spaced apart edge portions; and a projection engaging said ejector arm and said spacer arm such that travel of the projection along the driving gap interacts with said ejector arm to move said slider from the disc cartridge insertion position to the disc playback position.

* * * * *